United States Patent
Pandey et al.

(10) Patent No.: US 11,289,075 B1
(45) Date of Patent: Mar. 29, 2022

(54) ROUTING OF NATURAL LANGUAGE INPUTS TO SPEECH PROCESSING APPLICATIONS

(71) Applicant: Amazon Technologies, Inc., Seattle, WA (US)

(72) Inventors: Rajesh Kumar Pandey, Bothell, WA (US); Ruhi Sarikaya, Kirkland, WA (US); Shubham Katiyar, Seattle, WA (US); Arun Kumar Thenappan, Seattle, WA (US); Isaac Joseph Madwed, Seattle, WA (US); Jihwan Lee, Kirkland, WA (US); David Thomas, Woodinville, WA (US); Julia Kennedy Nemer, Seattle, WA (US); Mohamed Farouk AbdelHady, Redmond, WA (US); Joe Pemberton, Seattle, WA (US); Young-Bum Kim, Kirkland, WA (US); Hao Yuan, Seattle, WA (US); Prasha Shrestha, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 165 days.

(21) Appl. No.: 16/714,497

(22) Filed: Dec. 13, 2019

(51) Int. Cl.
*G10L 15/18* (2013.01)
*G10L 15/22* (2006.01)
*G06N 20/00* (2019.01)
*G06F 40/30* (2020.01)

(52) U.S. Cl.
CPC .......... *G10L 15/1815* (2013.01); *G06F 40/30* (2020.01); *G06N 20/00* (2019.01); *G10L 15/22* (2013.01); *G10L 2015/223* (2013.01); *G10L 2015/225* (2013.01); *G10L 2015/228* (2013.01)

(58) Field of Classification Search
CPC ................ G10L 15/1815; G10L 15/22; G10L 2015/223; G10L 2015/228; G10L 2015/225; G06N 20/00; G06F 40/30; G06F 40/35
See application file for complete search history.

(56) References Cited

U.S. PATENT DOCUMENTS

| | | | |
|---|---|---|---|
| 8,706,656 B1 * | 4/2014 | Lin ........................ | G06N 20/00 706/12 |
| 8,954,326 B2 * | 2/2015 | Kwak ..................... | G10L 15/22 704/246 |
| 9,401,140 B1 * | 7/2016 | Weber .................... | G10L 15/00 |

(Continued)

*Primary Examiner* — Eric Yen
(74) *Attorney, Agent, or Firm* — K&L Gates LLP

(57) ABSTRACT

Devices and techniques are generally described for using user feedback to determine routing decisions in a speech processing system. In various examples, first data representing a first utterance may be received. Second data representing a first semantic interpretation of the first utterance may be determined. A first intent data processing application may be selected for processing the second data. Feedback data may be determined related to the first intent data processing application processing the second data. Third data representing a semantic interpretation of a second utterance may be received, wherein the first semantic interpretation is the same as the second semantic interpretation. A second intent data processing application may be determined for processing the third data based at least in part on the feedback data.

20 Claims, 9 Drawing Sheets

(56) References Cited

U.S. PATENT DOCUMENTS

| | | | |
|---|---|---|---|
| 9,613,624 B1* | 4/2017 | Kramer | G10L 15/08 |
| 10,853,563 B1* | 12/2020 | Chen | G06F 16/2228 |
| 10,885,432 B1* | 1/2021 | Dulac-Arnold | G06N 3/0454 |
| 11,055,355 B1* | 7/2021 | Monti | G10L 15/22 |
| 2004/0044516 A1* | 3/2004 | Kennewick | G10L 15/22 704/5 |
| 2007/0203869 A1* | 8/2007 | Ramsey | G06F 40/35 706/52 |
| 2012/0209801 A1* | 8/2012 | Onsjo | G06Q 40/00 706/52 |
| 2014/0222436 A1* | 8/2014 | Binder | G10L 17/24 704/275 |
| 2016/0042748 A1* | 2/2016 | Jain | G10L 15/22 704/9 |
| 2016/0275413 A1* | 9/2016 | Shi | G06N 20/00 |
| 2017/0111507 A1* | 4/2017 | McGann | H04L 67/02 |
| 2018/0089553 A1* | 3/2018 | Liu | G06N 3/006 |
| 2019/0114321 A1* | 4/2019 | Lam | G06N 20/00 |
| 2019/0354869 A1* | 11/2019 | Warde-Farley | G06N 3/006 |
| 2020/0192350 A1* | 6/2020 | Celia | G10L 15/16 |
| 2020/0285813 A1* | 9/2020 | Singh | G10L 15/187 |
| 2020/0364512 A1* | 11/2020 | Lee | G06K 9/6264 |
| 2021/0019375 A1* | 1/2021 | Croutwater | G06F 40/30 |
| 2021/0089869 A1* | 3/2021 | Baughman | G06F 17/18 |

* cited by examiner

ROUTING OF NATURAL LANGUAGE INPUTS TO SPEECH PROCESSING APPLICATIONS

BACKGROUND

Automatic speech recognition (ASR) combined with language processing techniques may enable a computing device to retrieve and process commands from a user based on the user's spoken commands. In some systems, speech recognition and/or voice-controlled devices activate upon detection of a spoken "wakeword." Natural language processing is used to translate the spoken requests into semantic interpretations of the spoken command. An intent data processing application (often referred to as a "skill") is selected for processing the spoken request. Executable instructions are generated based on the semantic interpretation of the spoken command. The executable instructions are executed by the skill and a corresponding task is performed. Such speech processing and voice control may be used by personal computers, hand-held devices, telephone computer systems, and a wide variety of other computing devices to improve human-computer interactions and to control various systems.

DETAILED DESCRIPTION

Figure 1A:
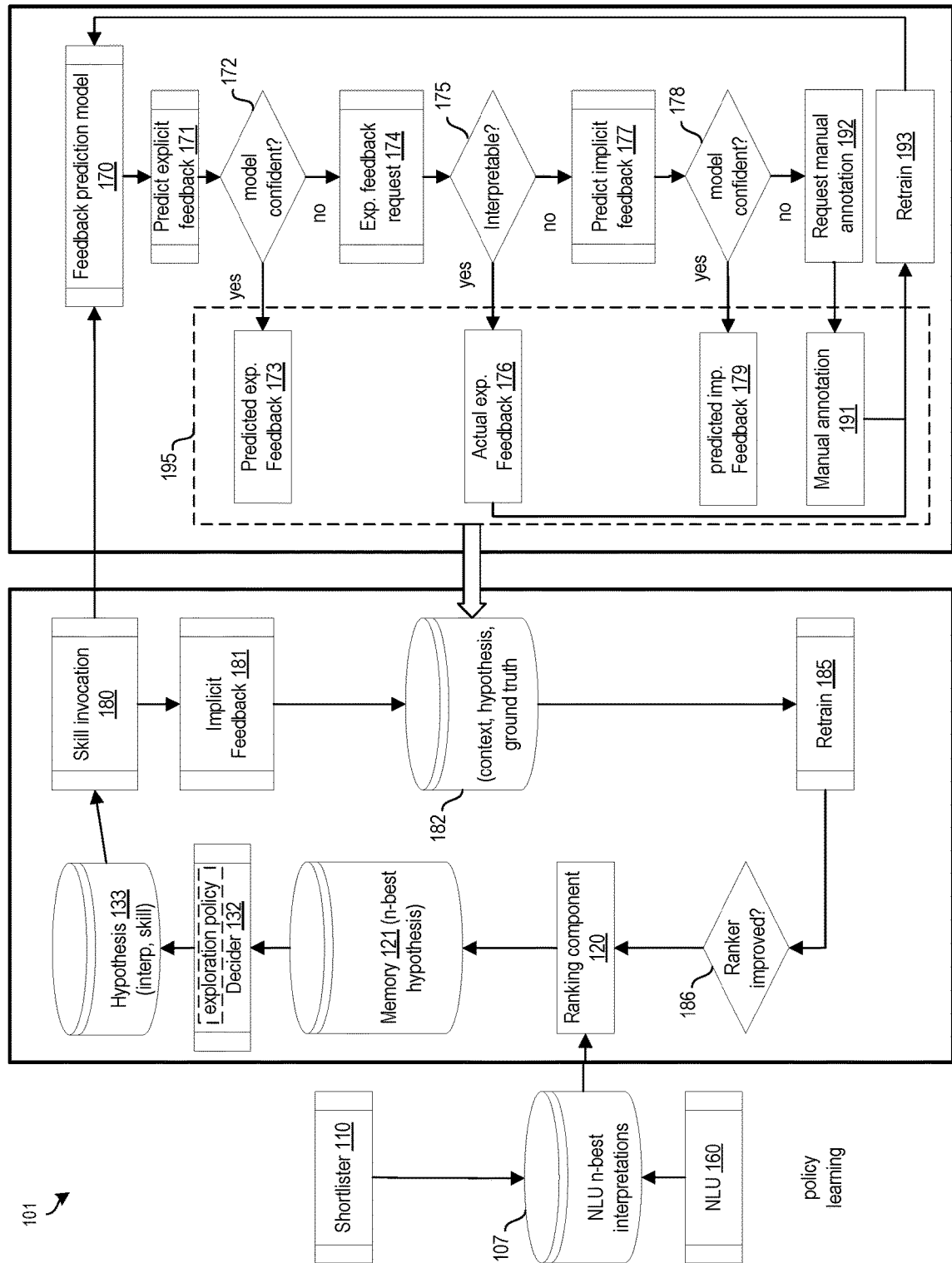
FIG. 1A is a block diagram illustrating an example speech processing routing flow, according to various embodiments of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language, resulting in specific executable commands or other type of instructions. Text-to-speech (TTS) is a field of computer science, artificial intelligence, and linguistics concerned with enabling computers to output synthesized speech. ASR, NLU, and TTS may be used together as part of a speech processing system.

Spoken language understanding (SLU) is a field of computer science, artificial intelligence, and/or linguistics that receives spoken language as an input, interprets the input, and generates executable commands that may be executed by one or more other computing devices and/or speech processing components. In various examples, spoken language understanding may be a combination of ASR systems and NLU systems, while in other examples, spoken language understanding may be a single model or other type of component effective to perform the functions of both ASR and NLU or otherwise take audio data as an input and output executable commands or other types of instructions representing the meaning of the audio data. In various further examples, SLU may include TTS where a machine learning model may receive input audio data (e.g., a user utterance) and may generate output audio data in response to the utterance. As used herein, user utterances, input text data, and/or any form of requests input to a speech processing system may be described by "request data" and/or "user request data." Such request data may change forms many times during processing of the request data by various components of the speech processing system, as described in further detail below. For example, initially the request data may be audio data and/or input text data representing a user question. The audio data may be transformed into text data by an ASR component of the speech processing system. The text data may be transformed into intent data by an NLU component of the speech processing system. The intent data may be used by an intent data processing skill (sometimes referred to as an intent data processing application) to perform an action. "Request data" and/or "user request data" may refer to any data related to an input request to a speech processing system (e.g., including the various data forms described above, as each of the aforementioned data types relate to an input request to the speech processing system). In general, as used herein, speech processing "applications" may be any software (and/or combination of software and hardware) used during natural language processing to take an action in response to input request data (e.g., natural language inputs such as user utterances and/or text). Such applications may include speech processing skills, speechlets, and/or other types of speech processing software. Similarly, "skills," as used herein, may refer to any types of intent data processing applications.

In various examples, speech processing systems may determine an action to take for processing a particular utterance according to an interpretation of the utterance determined by NLU. For example, a particular intent data processing application—sometimes referred to as a "skill" when the application is executed by a system located physically remote from the user's device or otherwise interfaces with a speech processing system—may be selected to process request data based on a determination that the utterance pertains to the particular skill. For example, a skill may be selected to process request data based on one or more intents and/or named entities determined during NLU processing of the utterance. In another example, a speech processing system may determine an application that may generate a response to a user utterance that may be output via a TTS component of the speech processing system. Selection of the appropriate action and/or the appropriate speech processing component used to take the action and/or process the utterance is non-trivial. In various examples described herein, user feedback may be used to select a skill that may be used to process a particular utterance. In various examples, the user feedback may be explicit feedback that is requested from the user after processing the utterance using a skill. In some other examples, the user feedback may be implicit feedback that is determined based on user behavior during and/or after utterance processing by a skill (e.g., whether the user interrupts playback and/or requests that an action taken be stopped).

In various examples, a ranking component (e.g., a selection component) may be used to select a group of skills for processing request data. In at least some examples, the ranking component may be used to rank candidate skills for processing request data. In at least some examples, each candidate skill may be paired with a natural language interpretation of the utterance that may be handled by the candidate skill. The natural language interpretation may be generated by an NLU component and may include an intent of the user (e.g., an action that the user desires be performed) as well as pertinent pieces of information in the text data (e.g., received from an ASR component) that allow an intent data processing application (e.g., a skill) to perform some action using the intent. Such skill/interpretation pairs may be ranked by the ranking component according to a likelihood that a skill/interpretation pair is well-suited for processing the utterance. In various examples, the machine learning model(s) of the ranking component may be trained and/or updated using user feedback. In some examples, machine learning models of the ranking component may generate ranked lists of skill/interpretation pairs using an input feature representing user feedback. For example, contextual data indicating past user feedback for a particular user and/or class of users resulting from processing the same or a similar utterance may be used as an input feature to a machine learning model of the ranker component in order to provide personalized ranking results. In some other examples, user feedback for a particular skill may be predicted (e.g., predicted feedback data) prior to processing request data by the skill. Predicted feedback data may represent a prediction of user-generated feedback related to processing of the current intent data by a particular skill. The predicted user feedback data may be used to retrain the ranking component and/or other machine learning models of a speech processing system that are used to dynamically route speech processing requests (e.g., input utterances) to a particular skill for processing. In other example embodiments, the predicted user feedback data may be used as an input signal to a skill ranking and/or selection component that may be used to select an application to process current request data.

In various examples, a new skill (e.g., a skill that has been developed and recently deployed for use by users of a speech processing system) may not be associated with a large amount of user feedback (or with any user feedback), as the skill is new and has not yet been used to process a large number of (or any) user requests. In various examples, a new skill, as used herein, may comprise a skill that has less than a pre-selected amount of user feedback data that has been collected in association with use of the skill. Examples may include newly-developed/deployed skills, skills deployed in new geographic locations/regions, skills used on new and/or different devices relative to where the skill was previously implemented, etc. Accordingly, the ranking component may not have been trained on any data that may be used to appropriately rank the new skill. In various examples described herein, a decider component may route some utterance-initiated traffic to the new skill. In at least some cases, the decider component may route some percentage of user request data to the new skill according to an exploration policy implemented by the decider component. The exploration policy may identify new skills and/or skills to request data traffic in spite of the skills not being the top-ranked result for the current request data. In various examples, only a small percentage of utterance traffic may be routed to the new skill, in order to avoid and/or reduce user friction. In some examples, only utterances with predefined characteristics (e.g., emanating from a particular geographic region, a particular class of users, received during a particular time of day, etc.) specified by the exploration policy may be routed to the new skill.

Explicit feedback may be elicited for user interactions with the new skill. Additionally, over time, a user feedback prediction component may include a machine learning model (e.g., a feedback prediction machine learning model) that may be trained and/or updated based on user interactions with the new skill. Eventually, the user feedback prediction model may predict user feedback for the new skill without requesting explicit user feedback. The user feedback obtained for the new skill (e.g., predicted user feedback and/or explicitly/implicitly obtained user feedback) may, in turn, be used to update machine learning models of the ranking component. Advantageously, predicting user feedback may avoid frequently requesting explicit user feedback, which may annoy the user. Additionally, predicting user feedback may reduce the amount of manual annotation used to generate a training dataset. Once the ranking component has been updated, the exploration policy may be removed, as the ranking component may be effective to rank utterance traffic to the new skill according to the user feedback obtained while the exploration policy was instituted. In various examples, the exploration policy may indicate skills that have received and/or are associated with less than a threshold amount of feedback data. Accordingly, skills that have not yet received a sufficient amount (e.g., less than the threshold amount) of feedback data may be routed to according to the exploration policy in order to then generate feedback data. For example, after routing to such skills by the exploration policy, feedback data may be explicitly requested and/or predicted using the various techniques described herein. In at least some examples, feedback may be requested and/or predicted based on a determination that a skill has received (and/or is associated with) less than a threshold amount of feedback data. In at least some further examples, an exploration policy may determine an amount of feedback data associated with a particular skill and may route request data to one or more skills based on a determination that the skill has not received enough feedback data (e.g., by comparing a current amount of feedback data to a threshold and/or by using a machine learning model to determine whether or not the skill needs additional feedback data in order to optimize ranking/routing to the skill).

Described herein is a speech processing routing system that may be used to dynamically determine the appropriate action and/or the appropriate speech processing component to process request data. In various examples, the speech processing routing system may be used to determine routing destinations for request data for processing the request data.

The speech processing routing system may facilitate the routing of request data to appropriate skills and/or other speech processing components. In various examples, the speech processing routing system may use machine learning models trained using features computed using user feedback data, context data, and/or other predictive signals in order to determine the appropriate skill and/or other speech processing component to process request data. In various examples, using machine learning models to dynamically learn routing may improve the accuracy of the routing of speech processing requests, resulting in improved user experiences and/or more pertinent responses to user request data. For example, a machine learning system may dynamically learn from contextual data and/or user feedback data to provide routing exceptions and/or routing flexibility, in contrast to a deterministic routing system.

In an example embodiment, a ranking and arbitration component may receive a list of features that are used as inputs to various machine learning models of the speech processing system. Features may include vectors, tensors, and/or other structured data that may be used as an input to a machine learning model in order to generate a prediction (e.g., a speech processing routing prediction for request data). For example, the NLU system may use one or more machine learning models to determine a semantic interpretation of user request data. The NLU system may use various features as input. For example, the NLU system may use a feature representing text data representing the request data, a feature representing context data describing a context of the request data (e.g., geographic location identifier of the device at which the request data was received, time of day, device identifier, user identifier, and so on), etc. In another example, a ranking component (sometimes referred to as a "skill ranking component") may use a feature representing user feedback data indicating user feedback related to similar request data. In various examples, at least some of the features used by the ranking component and/or other speech processing component may be pre-computed prior to the processing of the request data, while other features used by the ranking component (and/or other speech processing component) may be computing during request data processing, in an on-demand fashion. For example, the text data representing the request data may be computed in response to receipt of the request data (e.g., during processing of the request), while a feature indicating user feedback over the past 3 days for similar request data may be pre-computed by the ranking and arbitration component prior to receipt of particular request data. Features that are pre-computed by the ranking and arbitration component may be defined and specified to the ranking and arbitration component prior to online processing of request data.

Accordingly, the ranking and arbitration component may generate pre-computed features according to definition data specified prior to online speech processing execution. The definition data may define features to be precomputed and may include identification of source data used to calculate the feature. Similarly, the definition data may include functions and/or formula used to calculate the features from the source data. In various examples, the feature definition data may be supplied to the ranking and arbitration component via an application programming interface (API). In other examples, speech processing components may determine the feature definition data and may send the feature definition data to the ranking and arbitration component. For example, a skill shortlister component may specify a feature that is to be pre-computed and made available for use by one or more machine learning models of the skill shortlister. The one or more machine learning models of the skill shortlister may use the feature as an input, and may determine a subset of possible skills for processing request data as an output. For example, the skill shortlister may specify that user feedback data from the past day and context data from the past 2 hours are to be used to calculate the feature. The skill shortlister may further define a manner in which the feature is to be calculated using the user feedback data and the context data. For example, the skill shortlister may supply data representing a formula used to calculate the feature. The formula may use a numerical representation of the user feedback data and a numerical representation of the context data to generate a vector representation of the feature.

It should be appreciated that the foregoing example is illustrative only. In general, features may be pre-computed by the ranking and arbitration component for any machine learning models used by the speech processing system. The features may be pre-computed according to feature definitions supplied to the ranking and arbitration component prior to processing of request data (e.g., prior to runtime).

The ranking and arbitration component may store the various pre-computed features in one or more data structures in a non-transitory computer-readable memory accessible by the ranking and arbitration component. The ranking and arbitration component may generate one or more forward and/or inverted indexes that may be used to query the ranking and arbitration component for a particular pre-computed feature (e.g., by performing a lookup operation). Accordingly, during online request data processing, any speech processing component may query the ranking and arbitration component (e.g., through an API) in order to retrieve the pertinent feature(s) for the machine learning models employed by that speech processing component.

The ranking and arbitration component may communicate with one or more data sources to obtain the data used to compute the features according to the feature definitions. For example, the ranking and arbitration component may communicate with a context system that provides context data related to past speech processing interactions (e.g., location data, device identifier data, timing data, user account data, etc.). In another example, the ranking and arbitration component may communicate with a user feedback component that provides indications of past implied and/or explicit user feedback resulting from past user interactions with the speech processing systems (e.g., based on a past experience with a skill). In another example, the ranking and arbitration component may communicate with a service that provides skill data related to past processing of request data by a particular skill (e.g., whether or not a skill was able to successfully process a past request data, etc.). In general, the ranking and arbitration component may be configured in communication with any applicable data source that may be used to precompute features for machine learning models of the speech processing system.

Additionally, in some embodiments described herein, a decider component may provide an exploration policy defining a dynamic routing adjustment for routing request data to a newly-instantiated speech processing skill. For example, if machine learning models are used to control routing decisions within a speech processing system, the machine learning models may not route request data traffic to a newly-instantiated speech processing skill as there is no historical training data tending to indicate that such a new skill is appropriate for processing incoming request data. Accordingly, a decider component may comprise an interface (e.g., an API) that allows new skills to be defined within the speech processing system and that allows some speech processing traffic (e.g., user request data) to be diverted from their model-predicted speech processing path to the new skill according to an exploration policy. In various examples and as described in further detail below, the exploration policy may define a dynamic routing adjustment that may be performed to divert some request data traffic from the nominal destination skill to a new skill according to the dynamic routing adjustment.

Over time, the typical feedback data (e.g., context data, user feedback data, etc.) may be determined resulting from the use of the new skill. Similarly, as described below, over time user feedback data may be predicted for the new skill using a feedback prediction model. The feedback data may, in turn, be used as training data to update the various machine learning models controlling routing of speech processing request data (e.g., the ranking component, shortlister, etc.). Accordingly, over time (and/or as more data is processed by the machine learning models) the machine learning models may learn what types of traffic should be routed to the new speech processing service and the routing exception provided by the exploration policy defining the dynamic routing adjustment may be removed. In some other examples, user feedback may be predicted for each candidate skill used to process particular request data by a feedback prediction model. The predicted user feedback (for each candidate skill) may be represented as feature data and used as an input to a ranking component used to rank the candidate skills for process the current request data.

In some examples, the exploration policy defining a dynamic routing adjustment may receive predicate data that defines the characteristics of incoming request data traffic that is to be diverted to the new skill. In addition, the dynamic routing adjustment may receive an indication of the action(s) provided by the new service. Thereafter, the dynamic routing adjustment may send at least some incoming request data that satisfy the predicate data to the new skill. For example, a percentage of the traffic satisfying the predicate data may be sent to the new skill. In at least some examples, the percentage may be configurable. Further, in an example embodiment, prior to performing routing adjustment to accommodate a new skill, the dynamic routing adjustment component may test the routing adjustment using historical data to ensure that the amount of traffic diverted from legacy services to the new skill is acceptable.

In some embodiments described herein, a ranking component may generate a ranked list including an identification of a ranked subset of skills to which to route user request data for processing. In various examples, the ranking component may rank the skills output by the shortlister component (described above) in descending order of confidence scores, with the top result (e.g., the highest-ranked and/or scored skill) being the skill that has been determined by the models of the ranking component as being the most appropriate skill for processing the current request data. The ranking component may include one or more machine learning models that may be trained using user feedback generated using the various techniques described herein.

In some examples, the decider component may store policies that may control whether or not explicit user feedback is solicited (e.g., via a feedback request output as an audio representation via TTS) after the completion of an action (e.g., by the top-ranked skill determined by the ranker component). In some further examples, solicitation of explicit user feedback may be contingent upon whether a feedback prediction model is able to confidently predict user feedback for a particular skill and/or request data interpretation. For example, a feedback prediction model may output a high confidence score (e.g., a confidence score above a threshold confidence value). The confidence score may represent the likelihood that user feedback predicted by the feedback prediction model is accurate for the given skill and/or request data interpretation. In various examples, the feedback prediction model may predict user feedback for a particular skill/request data interpretation prior to the skill actually processing the request data.

Speech processing may be used in a variety of contexts, including in speech processing enabled devices (e.g., devices employing voice control and/or speech processing "voice assistants") and/or systems. Examples of speech processing systems and/or voice-enabled personal assistants include the Siri system from Apple Inc. of Cupertino, Calif., voice-enabled actions invoked by the Google Assistant system from Google LLC of Mountain View, Calif., Dragon speech recognition software from Nuance Communications of Burlington, Mass., the Cortana system from Microsoft of Redmond, Wash., the Alexa system from Amazon.com, Inc. of Seattle, Wash., etc.

Speech processing enabled devices may include one or more microphones (e.g., far-field microphone arrays) used to transform audio into electrical signals. Speech processing may then be performed, either locally by the speech processing enabled device, by one or more other computing devices communicating with the speech processing enabled device over a network (e.g., network 198 of FIG. 5B), or by some combination of the speech processing enabled device and the one or more other computing devices. In various examples, speech processing enabled devices may include and/or may be configured in communication with speakers and/or displays effective to output information obtained in response to a user's spoken request or command, and/or to output content that may be of interest to one or more user's.

Storage and/or use of data related to a particular person or device (e.g., contextual data and/or any personal data) may be controlled by a user using privacy controls associated with a speech processing enabled device and/or a companion application associated with a speech processing enabled device. Accordingly, users may opt out of storage of personal and/or contextual data and/or may select particular types of personal and/or contextual data that may be stored while preventing aggregation and storage of other types of personal and/or contextual data. Additionally, aggregation, storage, and use of personal and/or contextual information, as described herein, may be compliant with privacy controls, even if not legally subject to them. For example, personal, contextual, and other data described herein may be treated as if it was subject to acts and regulations, such as the Health Insurance Portability and Accountability Act (HIPAA) and the General Data Protection Regulation (GDPR), even if it is not actually subject to these acts and regulations. In various examples, the data that may be used to optimize the machine learning techniques described herein may be used only in accordance with user permission, in compliance with any relevant laws and/or policies. Additionally, users may opt out of data collection, and/or may opt to delete some or all of the data used by the various techniques described herein, even where deletion or non-collection of various data may result in reduced functionality and/or performance of various aspects of the systems described herein.

A speech-controlled computing system may respond to user request data by outputting content and/or performing one or more other actions, such as initiating communications (e.g., synchronous phone/video calls and/or asynchronous messaging), playing music, providing information, calling a taxi, displaying an image, controlling other devices, etc.

Generally, input data received by the various speech processing systems and components described herein may comprise natural language input data. Natural language input data may be request data in the form of audio data representing spoken user utterances (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Speech processing systems may be configured with multiple applications (e.g., thousands, tens of thousands, or more applications) that can be used to potentially respond to a user request. Applications may be referred to herein as "skills". Natural language processing systems may be effective to process spoken and/or textual natural language inputs to determine data representing a semantic interpretation of the inputs (e.g., semantic interpretation data). Skills may include any application effective to receive inputs from a natural language processing system in order to take one or more actions based on those inputs. For example, a speech processing system may include music skills, video skills, calendar skills, timer skills, general knowledge answering skills, game skills, device control skills, etc. As described herein, skills receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.).

The invocation of a skill by a user's utterance may include a request that an action be taken. In at least some examples, a "skill," "skill component," "speech processing skill," and the like may be software running on a computing device, similar to a traditional software application running on a computing device. Such skills may include a voice user interface in addition to or instead of, in at least some instances, a graphical user interface, smart home device interface, and/or other type of interface.

As previously described, in at least some examples, a "skill," "skill component," and the like may be software that is run by a third party to the herein disclosed speech processing system (e.g., a 3P skill developer), without the third party provisioning or managing one or more servers for executing the skill. In such an implementation, the system may be triggered to run a skill in response to the third party calling the system via the Internet or a mobile application. Such implementation may include, but is not limited to, Amazon's AWS Lambda.

In various examples, a speech processing enabled device may include a wakeword detection component. The wakeword detection component may process audio data captured by microphones of the speech processing enabled device and may determine whether or not a keyword (e.g., a wakeword) is detected in the audio data. When a wakeword is detected, the speech processing enabled device may enter a "sending mode" in which audio detected by the microphones following the wakeword (e.g., data representing a user utterance spoken after the wakeword) may be sent to speech processing computing component(s) for further speech processing (e.g., ASR, NLU, etc.). In various examples, the wakeword detection component may be used to distinguish between audio that is intended for the speech processing system and audio that is not intended for the speech processing system.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result may determine the activation of a neuron in a subsequent layer. In addition, a bias value may be used to shift the output of the activation function to the left or right on the x-axis and thus may bias a neuron toward inactivation.

Generally, in machine learning models, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. Updating the parameters of a machine learning model may generally be referred to as updating the model and/or training the model. For example, the machine learning model may use a gradient descent algorithm (or gradient ascent algorithm) to incrementally adjust the weights to cause the most rapid decrease (or increase) to the output of the loss function. The method of updating the parameters of the machine learning model may be referred to as back propagation. In various examples, after a machine learning model has been trained, the model may be referred to as a "machine learned model."

FIG. 1A is a block diagram illustrating an example speech processing routing flow 101, according to various embodiments of the present disclosure.

Figure 2:
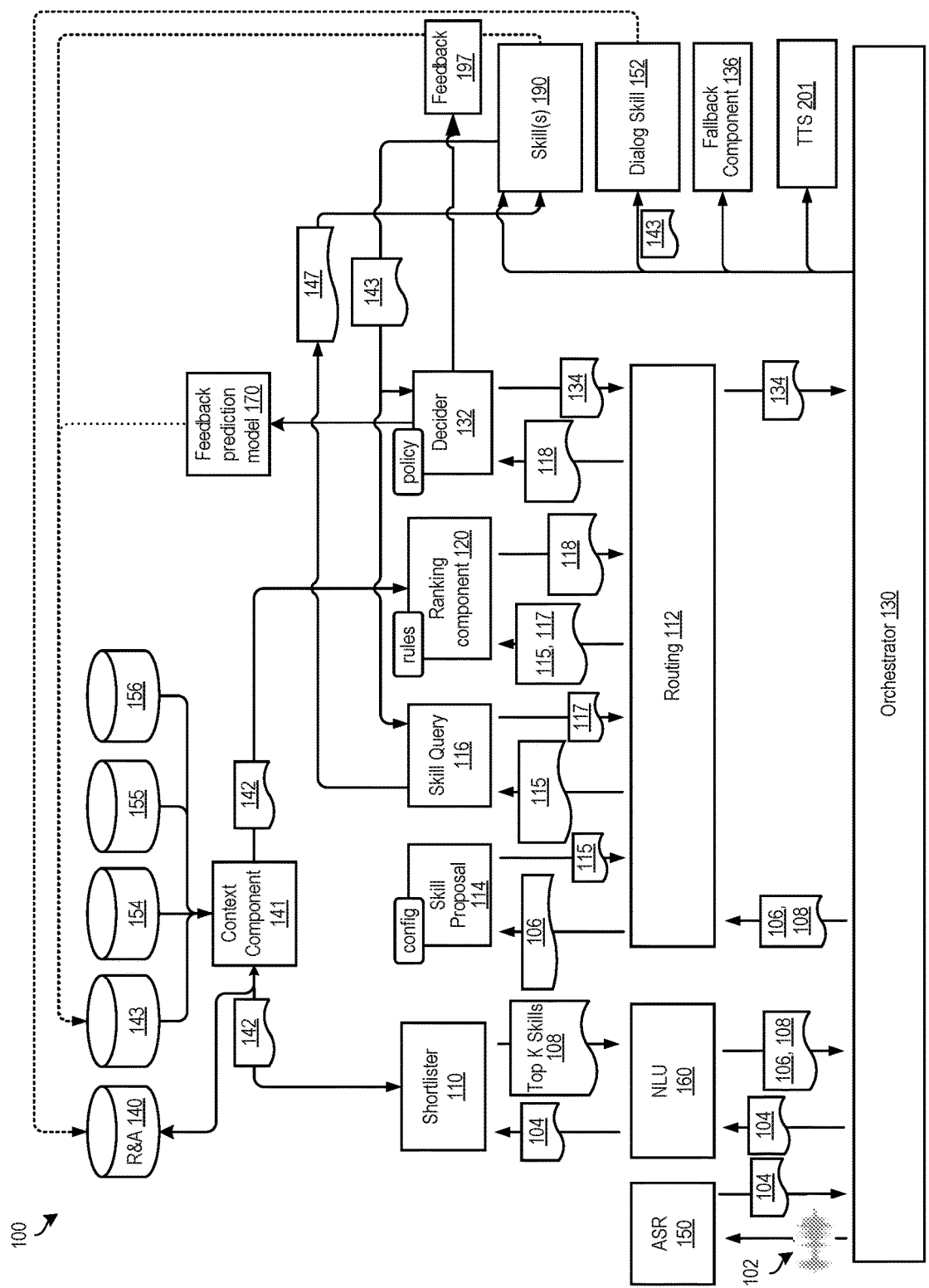
FIG. 2 is a block diagram illustrating an example speech processing routing system, according to various embodiments of the present disclosure.

In various examples, upon receiving request data and/or other natural language input (e.g., typed text) as an input, a speech processing system may generate text data representing the input utterance using an ASR component 150 (FIG. 2). As used herein, the term "utterance" may refer to any natural language input, such as a spoken request/command/question and/or text input.

In various examples, a natural language component 160 (depicted in FIG. 1A as NLU 160) may use one or more statistical machine learning models to generate NLU output data 106 (FIG. 2) that may represent one or more semantic interpretations of the request data. In various examples, the shortlister 110 may be a speech processing component that may receive the text data representing the request data generated by ASR component 150 and may determine a subset of skills that are likely to be appropriate to process the request data. The shortlister may send the subset of skills to the natural language component 160. The natural language component 160 may generate an N-best list of interpretations of the request data (e.g., one or more interpretations for each skill of the subset of skills determined by shortlister 110). In the example speech processing routing flow 101, the N-best list of interpretations may be stored in a non-transitory computer-readable memory 107.

The N-best list of interpretations may be sent to a ranking component 120. The ranking component 120 may comprise one or more machine learning models effective to receive the N-best list of interpretations as an input and may generate a ranked list of the subset of skills determined by shortlister 110. Each item in the ranked list may be a hypothesis comprising data identifying a skill for processing the request data paired with a semantic interpretation of the request data for that skill. Accordingly, a "hypothesis" as used herein may refer to data representing an identity of a skill and data representing an interpretation of the current request data for that skill. In various examples below, the hypotheses may be referred to as candidate pairs 115 (e.g., skill identifier data and corresponding request data interpretation data for the skill). The ranked list of N-best hypotheses (e.g., ranked list of candidate pairs 115) may be stored in non-transitory computer-readable memory 121.

Decider component 132 may evaluate the ranked list of N-best hypotheses and may determine a routing plan (e.g., routing plan 134 depicted in FIG. 2) for the current request data. In various examples, the routing plan may be to send the request data (e.g., ASR text data, NLU data, intent data, slot data, named entity data, etc.) to the top-ranked skill identified in the top-ranked hypothesis 133 of the ranked list of N-best hypotheses for processing. As previously described, the top-ranked hypothesis may be a candidate pair including an identification of a skill and an interpretation of the request data (e.g., intent data, slot data, named entity recognition data, etc.) for the skill. Accordingly, at action 180, the skill indicated by the top-ranked hypothesis candidate pair may be selected for processing the request data. In various other examples, decider component 132 may determine that the request data should be routed to a different skill apart from the top-ranked skill output by the ranking component 120. For example, an exploration policy may define a dynamic routing adjustment. The current request data may include characteristics that match characteristics defined by the exploration policy for routing the request data to a skill defined by the dynamic routing adjustment. Accordingly, the exploration policy may define a certain percentage of utterance traffic to be routed to the new skill. In this example, the decider component 132 may generate a routing plan that specifies that the request data be routed to the skill indicated in the exploration policy. In such a case, the routing plan may define hypothesis 133 as the skill identifier of the skill in the exploration policy. Accordingly, the request data may be sent to the skill specified by the exploration policy for processing at action 180. In various examples, the decider component 132 may receive a signal from the shortlister 110 indicating new skills and/or skills that should be routed to according to an exploration policy. Accordingly, in some examples, decider component 132 may determine that a new skill identified in the ranked list output by ranking component 120 invokes a particular exploration policy. Accordingly, decider component 132 may send a particular percentage of request data traffic (e.g., incoming utterances) to the new skill according to the exploration policy. In various examples, decider component 132 may route a certain percentage of request data to new skills. The percentage may be defined by the exploration policy. In some examples, the percentage may be defined on a skill-by-skill basis.

In various other examples, prior to sending the request data to the top-ranked candidate skill for processing (and/or in parallel with sending the request data to the top-ranked candidate skill), the N-best hypotheses of ranking component 120 and/or the top-ranked hypothesis 133 (and/or the hypothesis including the skill selected for processing the request data) may be sent to a feedback prediction model 170. The feedback prediction model may receive the hypothesis (including a skill identifier and the interpretation of the request data for that skill) as input and may generate predicted user feedback score for the skill along with a confidence score indicating a confidence in the predicted feedback. In an example embodiment, feedback prediction model 170 may be a deep neural network with a neuron in the output layer indicating user satisfaction and another node in the output layer indicating user dissatisfaction. For a given input hypothesis, the feedback prediction model 170 may generate a confidence score for each class (e.g., for each neuron in the output layer). In various examples, feedback prediction model 170 may be used to predict explicit and/or implicit user feedback. In an example embodiment, feedback prediction model 170 may comprise two separate machine learning models—one model for predicting explicit user feedback and one model for predicting implicit user feedback.

In the example depicted in FIG. 1A, feedback prediction model 170 may predict explicit user feedback at action 171. As previously described, in various examples, the explicit user feedback may be predicted prior to the selected skill actually processing the request data.

A determination may be made at action 172 whether the feedback prediction model 170 is confident in its ability to predict the explicit user feedback at action 171 for the particular hypothesis. For example, a determination may be made whether the feedback prediction model 170 is confident in predicting positive user feedback for the particular hypothesis. Additionally, a determination may be made whether the feedback prediction model 170 is confident in predicting negative user feedback for the hypothesis. Confidence in the output of feedback prediction model 170 may be determined using various different techniques, depending on the desired implementation. If a determination is made at action 172 that the feedback prediction model 170 is confident in its prediction of positive or negative explicit user feedback, the explicit user feedback (e.g., feedback indicating user satisfaction or dissatisfaction) can be sent to non-transitory computer-readable memory and stored as predicted explicit user feedback at action 173. The predicted explicit user feedback may be stored in association with the hypothesis (e.g., the skill identifier data and the interpretation data representing the semantic interpretation of the request data).

Conversely, if a determination is made at action 172 that the feedback prediction model 170 is not confident in its prediction of positive or negative explicit user feedback, a dialog speechlet of the speech processing system may be used to solicit explicit user feedback at action 174. For example, a TTS component of the speech processing system may generate audio data representing feedback request data asking a user if the user was satisfied with their experience (e.g., the resulting experience related to processing the user's most recent utterance/request). At action 175, if the user's response is interpretable, the explicit user feedback may be stored in a non-transitory computer readable memory as actual explicit feedback at action 176. The actual explicit user feedback may be stored in association with the hypothesis (e.g., the skill identifier data and the request data interpretation for the skill).

Conversely, if the user's response is not interpretable by the speech processing system, the feedback prediction model 170 may predict implicit feedback at action 177. A determination may be made at action 178 whether the feedback prediction model 170 is confident in its ability to predict the positive or negative implicit user feedback for the particular hypothesis.

If there is confidence in the feedback prediction model 170's positive or negative result (e.g., a confidence value for positive/negative predicted implicit user feedback is above a confidence value threshold), the predicted implicit feedback may be stored in a non-transitory computer-readable memory at action 179. Conversely, if the confidence is below a confidence threshold and/or a determination is made that the feedback prediction model 170 is not confident in the predicted implicit user feedback for the current hypothesis, a speechlet may be used to solicit manual annotation

192. The manual annotation may be provided manually, offline, by one or more individuals. The manual annotation may indicate positive or negative user feedback for a given hypothesis sent to a given skill. The manual annotation may be stored in association with the hypothesis in a non-transitory computer-readable memory at action 191.

The actual explicit user feedback data stored at action 176 (stored in association with the hypothesis data) and the manual annotation data stored at action 191 (again stored in association with the hypothesis data) may be aggregated over a plurality of hypotheses and may be used to retrain the feedback prediction model 170 at action 193. For example, training data may be used to update parameters associated with feedback prediction model 170 to minimize a cost function. Retraining the feedback prediction model 170 may improve the feedback prediction model 170's ability to confidently predict explicit and/or implicit user feedback.

The various feedback—whether predicted, manually annotated, and/or provided by the user (e.g., "actual" feedback) in dashed box 195 may be sent to non-transitory computer-readable memory 182 and stored in association with the hypothesis used to generate the feedback data and with context data related to the hypothesis (e.g., data representing a time at which the request was received, a device identifier, a geographic location from which the request was received, data indicating a prior request by the user, etc.). Additionally, implicit user feedback generated at action 181 in response to the skill processing the request data at action 180 may be stored in the non-transitory computer-readable memory 182 in association with the hypothesis. When a sufficient amount of such data is aggregated in non-transitory computer-readable memory 182, the data may be used to retrain the ranking component 120 at action 185 (e.g., by updating parameters associated with ranking component 120 to minimize a cost function). In addition to storing training data in the non-transitory computer-readable memory 182, a test dataset may be generated. In various examples, a determination may be made whether the retraining of ranking component 120 improves the performance of the ranking component 120 relative to the previous instance of the model at action 186 (e.g., using AB testing) by inputting the test dataset to the current and previous instances of ranking component 120 and comparing the results. If the performance of the retrained ranking component 120 is not improved, the previous instance of the model may continue to be used during processing.

In an example embodiment, instead of using feedback prediction model 170 to predict user feedback for hypotheses, various heuristic approaches may instead be used. For example, a set of target utterances/natural language inputs for which the ranking component 120 should not make incorrect routing decisions may be determined for a particular skill (e.g., a new skill). User feedback may be collected for the target utterances/natural language inputs until the distribution of collected user feedback becomes stable (e.g., as measured using a confidence interval). A signature may be defined as the number of feedback data points collected until the distribution is stable along with a feedback type distribution). Accordingly, the signature may provide an estimate of the amount of noise in feedback for the target utterances/natural language inputs.

Thereafter, a number of conflicting utterances/natural language inputs may be collected for which different routing decisions are made between a legacy model and an updated ranking component 120 model. User feedback may be collected for the conflicting utterances/natural language inputs. The conflicting utterances/natural language inputs may be matched (e.g., using any desired distance function) with a target utterance/natural language input (e.g., by comparing the signature of the conflicting utterance with the target utterance). Ground truth feedback data may be determined for the conflicting utterances/natural language inputs using the feedback data of the matching target utterances. A training dataset for ranking component 120 may be generated in this way and may be used to update ranking component 120.

Figure 1B:
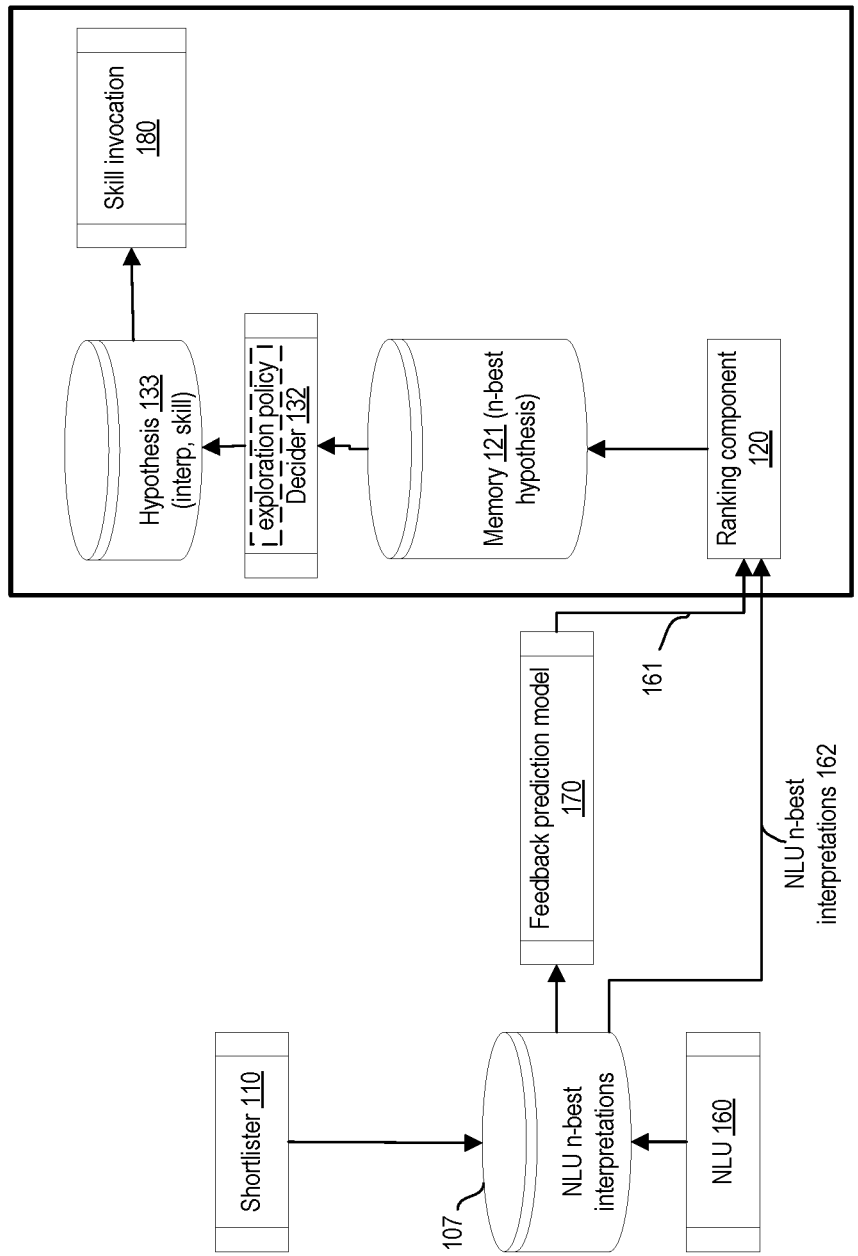
FIG. 1B is another block diagram illustrating another example speech processing routing flow, according to various embodiments of the present disclosure.

FIG. 1B is another block diagram illustrating another example speech processing routing flow, according to various embodiments of the present disclosure. Those components of FIG. 1B that have been described above in reference to FIG. 1A may not be described again herein, for purposes of clarity and/or brevity. In another example embodiment, candidate pairs (e.g., skill identifier data and corresponding request data interpretation data for the skill) determined by NLU 160 (e.g., the NLU N-best interpretations 162 of the request data) may be sent to feedback prediction model 170 prior to ranking of the candidate pairs by ranking component 120. Feedback prediction model 170 may predict user feedback (e.g., explicit and/or implicit predicted feedback) for each candidate pair, according to the techniques described above. The predicted user feedback data 161 predicted for each candidate pair may be sent as an input signal to machine learning models of ranking component 120. Additionally, the NLU N-best interpretation 162 of the request data may be sent to ranking component 120 as an input to machine learning models of ranking component 120. Accordingly, ranking component 120 may determine the ranked list of the candidate pairs for processing the current request data (e.g., the ranked list of the N-best hypotheses) based in part on the predicted user feedback data 161 for each candidate skill. In addition to the candidate pairs, the feedback prediction model 170 may receive context data (e.g., an account ID, user ID, geographic location information related to the request data, etc.) and may predict personalized user feedback based on the context data. For example, the predicted user feedback may be predicted for individual users, individual accounts, specific geographic regions, for specific device types, etc.

FIG. 2 is a block diagram illustrating an example speech processing routing system, according to various embodiments of the present disclosure. The various components illustrated FIG. 2 may be located on the same or different physical devices. Communication between various components illustrated in FIG. 2 may occur directly or across a network. A speech processing-enabled device may capture audio using an audio capture component, such as one or more microphone(s). The speech processing enabled device may send audio data 102 (e.g., corresponding to request data) to an orchestrator 130 of the speech processing system 100. The speech processing enabled device may also send metadata (e.g., including device identifiers, device type data, contextual data, IP address data, room location data, etc.) to the orchestrator 130. The components depicted in FIG. 2, including components of a speech processing system may be generally referred to as spoken language processing components, a speech processing system 100 a spoken language processing system, speech processing components, and/or a speech processing routing system. Additionally, in various examples, the components depicted in FIG. 2 may process written input (e.g., text data) in addition to spoken input.

Upon receipt by the speech processing system 100, the audio data 102 may be sent to an orchestrator 130. The orchestrator 130 may include memory and logic that enables the orchestrator 130 to initiate a dialog session and to transmit various pieces and forms of data to various components of the system, as described in further detail below.

The orchestrator 130 may send the audio data 102 to an ASR component 150 (e.g., a speech recognition component). The ASR component 150 may transcribe the audio data 102 into one or more hypotheses representing speech contained in the audio data 102. The ASR component 150 interprets the speech in the audio data based on a similarity between the characteristics of the audio data corresponding to the speech and pre-established language models. For example, the ASR component 150 may compare the audio data 102 with models for sounds (e.g., subword units such as phonemes) and sequences of sounds to identify words that match the sequence of sounds in the speech represented in the audio data 102. The ASR component 150 may send text data 104 generated thereby to orchestrator 130 that may, in turn, send the text data 104 to natural language component 160. As previously described, the text data 104 may include one or more ASR hypotheses. The text data 104 may include a top scoring hypothesis of the speech represented in the audio data 102 or may include an N-best list including a group of hypotheses of the speech represented in the audio data 102, and potentially respective scores ASR processing confidence scores. As previously described, in some other examples, the ASR component 150 (and/or other components of the speech processing system 100) may generate other metadata associated with the request data such as an overall request data confidence score, per-word (e.g., per token) confidence scores for the request data, request data duration, stream duration (e.g., duration of the stream of audio data from speech processing enabled device to speech processing system 100), a number of tokens output by ASR, etc.

The natural language component 160 attempts to make a semantic interpretation of the phrases or statements represented in the text data input therein. That is, the natural language component 160 determines one or more meanings associated with the phrases or statements represented in the text data 104 based on individual words represented in the text data 104. The natural language component 160 interprets a text string to derive an intent of the user (e.g., an action that the user desires be performed) as well as pertinent pieces of information in the text data that allow a device (e.g., the speech processing enabled device, the speech processing system 100, a computing device(s) implementing a skill, etc.) to complete the intent. For example, if the text data 104 corresponds to "Set temperature to 74 degrees," the natural language component 160 may determine the user intended to invoke a climate intent with a target temperature value slot of 74 degrees Fahrenheit. As previously described, in addition to the NLU intent and slot data, the natural language component 160 may generate other metadata associated with the request data (e.g., with the audio data 102). Examples of such metadata include, an NLU confidence score for the top intent hypothesis, NLU classification type (e.g., statistical vs. deterministic), NLU slot presence (e.g., data indicating that a particular slot was present), NLU confidence score for the overall top hypothesis (e.g., including the relevant skill, intent, and/or slot), entity recognition confidence scores, entity recognition match types (e.g., exact match, prefix match, suffix match, etc.), etc. Herein, the data output by the natural language component 160 (depicted in FIG. 1A as "NLU 160") is referred to as NLU output data 106.

Natural language component 160 may send the text data 104 and/or some of NLU output data 106 (such as intents, recognized entity names, slot values, etc.) to a shortlister 110. The shortlister 110 may comprise one or more machine learning models that may be effective to predict a subset of skills that are most likely to be able to correctly process the request data, based on the input of the text data 104 and/or the NLU output data 106. In addition, the shortlister 110 may call the ranking and arbitration component 140 to request features pre-computed by the ranking and arbitration component 140 according to features used as inputs by the machine learning models of shortlister 110. As previously described, the shortlister 110 may define source data used to compute the features and/or may specify functions used to generate the features from the source data (e.g., formulae and/or functions) prior to runtime processing of request data. The ranking and arbitration component 140 may precompute the features according to the specified feature definitions supplied by shortlister 110 and by the other components of speech processing system 100 and may store the precomputed features in memory. Ranking and arbitration component 140 may generate indexes that may be used to retrieve the precomputed features during runtime (e.g., through an API). Accordingly, during runtime processing, shortlister 110 may retrieve the precomputed features from ranking and arbitration component 140 and may use the precomputed features (among other inputs) to predict a subset of skills that are most likely to be appropriate to process the current request data. Accordingly, shortlister 110 may send the top K skills 108 to natural language component 160. Natural language component 160 may thereafter perform skill-specific NLU processing for the skills in the top K skills 108 to determine skill-specific intents, slots, and/or named entities. NLU output data 106 may include such skill-specific data (e.g., skill-specific N-best hypotheses).

Ranking and arbitration component 140 may communicate with various systems in order to obtain source data used to precompute features. For example, ranking and arbitration component 140 may communicate with feedback storage 143 to receive user feedback data (e.g., explicit and/or implicit user feedback related to user satisfaction with processing of request data). In various examples, the user feedback data may be user-specific and/or device specific and may indicate whether a user was satisfied or not satisfied with a particular interaction with speech processing system 100. Additionally, in various examples described herein, user feedback may be predicted using feedback prediction model 170. As previously discussed, in various examples user feedback data may be predicted for request data prior to processing the request data using a skill 190. In various examples, user feedback data may be used to pre-compute various features used by machine learning models of speech processing system 100. Accordingly, in some examples, the skills selected for processing particular request data may be determined based at least in part on skills that a user (or a group of similar users) has responded positively to in the past.

Additionally, ranking and arbitration component 140 may communicate with endpoint context system 154, which may provide context data at the conclusion of a user interaction with the speech processing system 100. In another example, ranking and arbitration component 140 may communicate with skill data 156 to determine information from the skill regarding past interactions with the skill and/or data acquired by the skill. Additionally, ranking and arbitration component 140 may communicate with other data sources 155, as new services are added and/or as new data types that may be useful for routing prediction are made available. In addition to ranking and arbitration component 140 using context data 142 to precompute features used by various machine learning models of the routing system of the speech processing system 100, a context system 141 may receive the context data 142. The context system 141 may provide the context data directly to both ranking and arbitration component 140 as well as to various components of the routing system of speech processing system 100. For example, the context system 141 may send context data 142 to shortlister 110 and/or ranking component 120 in order to determine a shortlist of skills 190 for particular request data and/or in order to rank the shortlisted skills.

NLU output data 106 and top K skills 108 may be sent by natural language component 160 to orchestrator 130. Orchestrator 130 may send the top K skills 108 and the NLU output data 106 to routing service 112. Routing service 112 may send the top K skills 108 and NLU output data 106 to skill proposal component 114. Skills 190 may subscribe to particular intents using skill proposal component 114. Accordingly, skill proposal component 114 may receive the NLU output data 106 and may determine whether any of the included intents correspond to one or more of skills 190. If so, skill proposal component 114 may generate candidate data comprising <Intent, Skill> candidate pairs 115. The candidate pairs 115 may be sent to routing service 112 and may be sent by routing service 112 to skill query service 116. Skill query service 116 comprises an API through which skills 190 may "opt out" of particular requests. For example, a skill 190 may comprise a video playback skill. Accordingly, the skill 190 may register with skill query service 116 to indicate that only requests made on a device with a display screen should be routed to the particular skill 190. In addition, skills 190 may communicate availability information, pricing information, and/or other structured descriptions of how and under what circumstances (e.g., determined using context data) the skill 190 can fulfill a request included in the current request data. Skill query service 116 may send a signal 117 indicating what skills can fulfill a particular request (and/or what skills are unable to fulfill the request). The signal 117 may be sent to routing service 112. Routing service 112 may send the signal 117 along with the candidate pairs 115 to a ranking component 120. As depicted in FIG. 2, skills 190 may send context data 142 to skill query service 116 to indicate situations in which a skill may opt out of processing a particular request (e.g., if the device sending the request data does not include a display screen, etc.). In various examples, the context data 142 sent by skills 190 to skill query service 116 may be skill and/or request specific context data. Additionally, skill query service 116 may send intent requests 147 to skills 190.

Ranking component 120 may include one or more statistical machine learning models effective to rank the candidates included in candidate pairs 115. In order to rank the candidate pairs 115, ranking component 120 may generate confidence scores for each corresponding candidate pairs 115. A confidence score may indicate that the corresponding skill 190 and/or intent of the candidate pair is appropriate to process the request. Ranking component 120 may compute features using the candidate pairs 115 and signal 117 in order to predict the ranking of the skills 190 included in the candidate pairs 115. The features computing during processing of the request data (sometimes referred to as "runtime features") may comprise a feature representation of the list of candidate pairs 115 and/or a representation of the signal 117. Additionally, ranking component 120 may query ranking and arbitration component 140 for precomputed features that have been defined for use by ranking component 120. As previously described, the precomputed features may be determined based on contextual data, user feedback data, past usage data, skill data, previous rankings of ranking component 120, etc. Additionally, ranking component 120 may compute runtime features using context data 142, user feedback data from feedback storage 143, and/or other data sources. In various examples, the loss function for the machine learning models of ranking component 120 may optimize based on user satisfaction scores computed using user feedback data from feedback storage 143.

Ranking component 120 may generate a ranked list 118 of the candidate skills indicated in candidate pairs 115. In at least some examples, the ranking component 120 may use a deep neural network as a machine learning model for determining the ranked list 118. As previously described, ranking component 120 may be trained using predicted user feedback data generated by feedback prediction model 170. In addition, ranking component 120 (and/or some other speech processing system 100 component, such as decider component 132) may determine plan data that may override the ranked list 118 such that a lower ranked skill and/or a skill that is not one of the candidate pairs 115 is selected for processing the request data.

For example, an exploration policy defining a dynamic routing adjustment may be inserted by the decider component 132 in order to emphasize a new skill 190. When a new skill is implemented, a list of utterances/natural language inputs that pertain to the new skill may be provided to shortlister 110 so that shortlister 110 can select the new skill among the top K skills 108, when appropriate. Shortlister 110 may send a signal to decider component 132 identifying the new skill as a new skill. The decider component 132 may determine that the new skill is among the hypotheses in ranked list 118. Accordingly, the decider component may divert some percentage of utterances to the new skill 190 in spite of the newly-implemented skill 190 not being the top result of ranked list 118. Once a sufficient amount of user feedback for the new skill 190 has been obtained, the dynamic routing adjustment may be removed. The machine learning models of the ranking component 120 and shortlister 110 may be retrained based on the new skill and based on the user feedback the new skill 190 has received as a consequence of the dynamic routing adjustment. Accordingly, thereafter the shortlister 110 may include the new skill 190 in the top K skills 108 as appropriate for a given incoming request. Similarly, ranking component 120 may rank the newly implemented skill 190 as appropriate for processing the request.

In another example, the decider component 132 may store policies that may control whether or not explicit user feedback is solicited (e.g., via TTS) after the completion of an action (e.g., by the top-ranked skill determined by the ranker component). Explicit feedback may be solicited through the dialog speechlet 152 prior to routing request data to a skill for processing. In another example, decider component 132 may control feedback component 197 to request explicit feedback from a user post-skill processing (e.g., via TTS). In various examples, feedback component 197 may ask the user whether or not the user was satisfied with the action taken by the speech processing system 100. In yet another example, an exploration policy defining a dynamic routing adjustment may send request data that matches predicate data defined using the dynamic routing adjustment component to a new skill 190. The decider component 132 may determine that the top ranked result from the ranking component 120 should be ignored due to the dynamic routing adjustment being performed by the dynamic routing adjustment component. Additionally, in some examples, a policy of the decider component 132 may be to solicit explicit feedback from the user whenever a new skill is routed to due to a dynamic routing adjustment. Accordingly, at the completion of the action, the decider component 132 may control TTS to inquire as to whether the user was satisfied with the interaction with the new skill and/or whether the performed action was the action intended by the user.

Decider component 132 may output plan data that comprises a routing plan 134 for processing the request data. The routing plan 134 may define a target skill 190 to process the request data. As described above, the target skill 190 may be selected as the top-ranked hypothesis determined by the ranking component 120. In some other examples, the decider component 132 may select a target skill 190 based on a policy, as described above. In some examples, the ranking component 120 may determine that two different skills are equally applicable for processing the request data. In such examples, the decider component 132 may determine that disambiguation should occur. Accordingly, the routing plan 134 may include sending the request data to a dialog speechlet 152 that may output (via TTS) one or more questions (e.g., a disambiguation request) used to prompt the user to disambiguate between the two equally likely (or approximately equally likely) interpretations of the request data. For example, it may be unclear, based on a user's request, whether the user intended to invoke a movie playback skill or a music playback skill, as a movie and a soundtrack for the movie may be identified using the same name. Accordingly, the decider component 132 may determine that the top two hypotheses of ranking component 120 are equally likely (or approximately equally likely) and may determine that a question should be asked to disambiguate between the two possible actions. Accordingly, the routing plan 134 may route the request data to the dialog speechlet 152, and the dialog speechlet 152 may inquire whether the user intended to play the movie or the soundtrack.

In another example, the decider component 132 may determine that the user was not satisfied with the top hypothesis of the ranking component 120 (e.g., due to explicit or implicit feedback received from the user in response to taking an action associated with the top ranking component 120 hypothesis). Accordingly, the decider component 132 may determine that the routing plan 134 should be to determine the second highest ranked hypothesis of the ranking component 120. The routing plan 134 may be sent to the fallback component 136. In various examples, the fallback component 136 may determine a list of the top hypotheses, top intents, and/or top ASR text interpretations from the previous turn of dialog, and may select a fallback option for processing the request data from the lists.

The speech processing system 100 may also include a TTS component 201 that synthesizes speech (e.g., generates audio data) corresponding to text data input therein. Accordingly, one or more of skills 190, dialog speechlet 152, fallback component 136, ASR component 150, and/or orchestrator 130. The TTS component 201 may perform speech synthesis using one or more different methods. In one method of synthesis called unit selection, the TTS component 201 matches text data against one or more databases of recorded speech. Matching units are selected and concatenated together to form audio data. In another method of synthesis called parametric synthesis, the TTS component 201 varies parameters such as frequency, volume, and noise to create an artificial speech waveform output. Parametric synthesis uses a computerized voice generator, sometimes called a vocoder.

Figure 3:
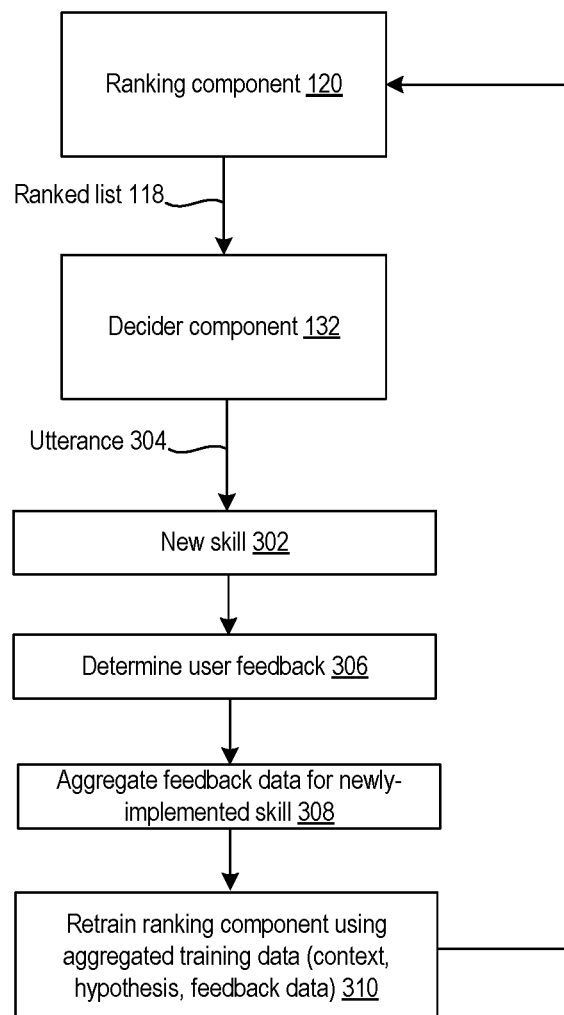
FIG. 3 is a flow diagram illustrating an example process for updating a routing system of a speech processing system using feedback data, in accordance with various embodiments described herein.

FIG. 3 is a flow diagram illustrating an example process for updating a routing system of a speech processing system using feedback data, in accordance with various embodiments described herein.

As described above, ranking component 120 may generate a ranked list of skills that may be used to process request data. However, when a new skill (e.g., new skill 302) is deployed, the ranking component 120 may be unable to rank the new skill for processing request data because the ranking component 120 has not been trained using training data that includes data related to the new skill. Accordingly, ranked list 118 in FIG. 3 may not include a ranking for new skill 302. Decider component 132 may receive the ranked list 118 from ranking component 120.

Decider component 132 may determine a plan (e.g., according to a dynamic routing adjustment) indicating that the request data 304 should be processed using new skill 302. For example, decider component 132 may use context data related to the request data (e.g., a user ID, a device ID, a geographic location where the utterance/natural language input was received, a time at which the utterance/natural language input was received, past utterance data received from the same device ID, etc.) to determine that the request data corresponds to predicate data for a dynamic routing adjustment. Accordingly, decider component 132 may determine plan data indicating that the request data should be processed by the new skill 302 based on the request data characteristics matching the predicate data of the dynamic routing adjustment.

The plan data output by the decider component 132 may be used to route the request data 304 to the new skill 302 for processing. At action 306, user feedback may be determined for the processing of request data 304 by the new skill 302. As described above, the user feedback may be actual explicit user feedback, actual implicit user feedback, predicted explicit user feedback, predicted implicit user feedback, and/or manual annotation of the hypothesis (e.g., skill identifier data along with an interpretation of the request data for the new skill 302).

The feedback data for the new skill may be aggregated at action 308 by storing the feedback data in a non-transitory computer-readable memory. In some examples, feedback data may be stored in association with a hypothesis and/or with context data related to the request data 304. When a sufficient amount of training data is available (e.g., greater than a threshold amount of data), the ranking component 120 may be retrained at action 310 using the aggregated training data. As described above, the newly-trained ranking component 120 may be compared to a previous model instance of the ranking component 120 and a determination may be made whether the performance of the ranking component 120 is improved as a result of the retraining.

Assuming that the retraining has improved the performance of the ranking component 120, the decider component 132 may remove the dynamic routing adjustment and new skill 302 may thereafter be routed to according to the results of the retrained ranking component 120.

It should be appreciated that similar techniques may be used to retrain machine learning models of shortlister 110, natural language component 160, and/or any other machine learning models of speech processing system 100 involved in routing request data to skills 190 for processing.

Figure 4:
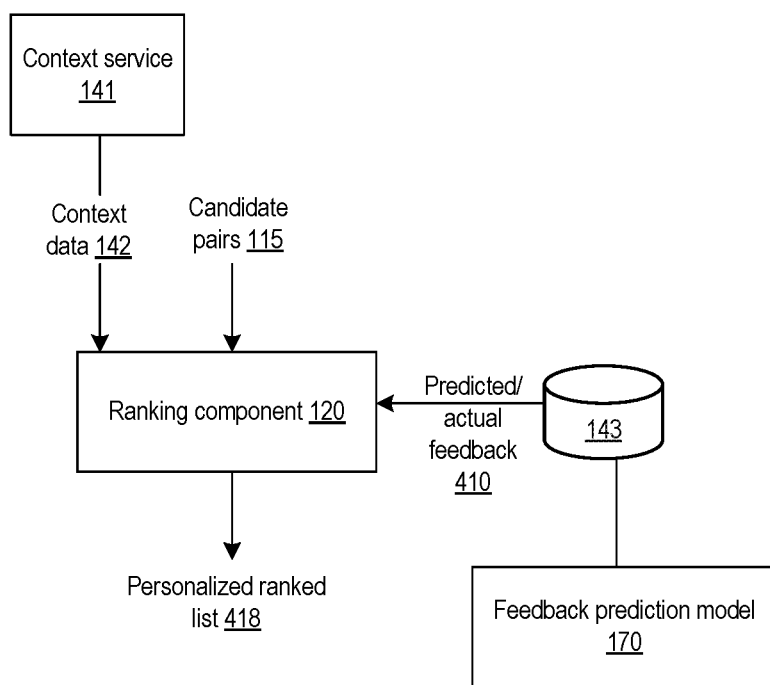
FIG. 4 is a flow diagram illustrating an example process for routing user input data to a particular skill for processing using feedback data, in accordance with various embodiments described herein.

FIG. 4 is a flow diagram illustrating an example process for routing user input data to a particular skill for processing using feedback data, in accordance with various embodiments described herein.

Ranking component 120 may comprise one or more statistical machine learning models effective to rank a list of hypotheses (e.g., skill identifier and NLU interpretation data for the skill) for processing request data. In the example depicted in FIG. 4, ranking component 120 may use input features determined using context data 142 from context system 141. Context data 142 may include any contextual data describing a context of the current request data. Examples may include metadata indicating a time at which the utterance/natural language input was received, data indicating past utterances/natural language inputs in the same dialog session, data identifying a user that spoke the utterance, etc. Additionally, ranking component 120 may receive candidate pairs 115. Candidate pairs 115 may be the hypotheses for the current request data (e.g., skill identifier data and corresponding request data interpretation data for the skill). The skills identified in candidate pairs 115 may be skills determined by shortlister 110 for the request data. In addition, ranking component 120 may receive actual and/or predicted feedback data 410 stored in feedback storage 143 and/or predicted by feedback prediction model 170.

In some examples, the predicted/actual feedback data 410 may include past feedback data generated for a particular hypothesis that matches the current hypothesis. For example, if a current hypothesis of candidate pairs 115 is (movie_skill_ID, "play It's a Wonderful Life"), the predicted/actual feedback data 410 may include feedback generated for the same skill identifier data and the same request data interpretation by the same user and/or by one or more other users. The predicted/actual feedback data 410 may be used to generate a feature input to ranking component 120.

In the example depicted in FIG. 4, ranking component 120 may use the various input feature data (e.g., features generated using context data 142, candidate pairs 115, predicted/actual feedback data 410, and/or any other desired input features) to generate personalized ranked list 418. The personalized ranked list 418 may be personalized in the sense that the ranking component 120 considered user feedback when ranking the candidate pairs 115. Accordingly, the output of ranking component 120 may be personalized using the predicted/actual feedback data 410. It should be appreciated that, in some examples, ranking and arbitration component 140 may be used to pre-calculate one or more of the input features used by ranking component 120. Additionally, although the example in FIG. 4 describes use of various feature data during prediction of an output of ranking component 120, similar features may be used as inputs to machine learning models of shortlister 110, natural language component 160, and/or any other machine learning models of speech processing system 100 involved in routing request data to skills 190 for processing.

Figure 5A:
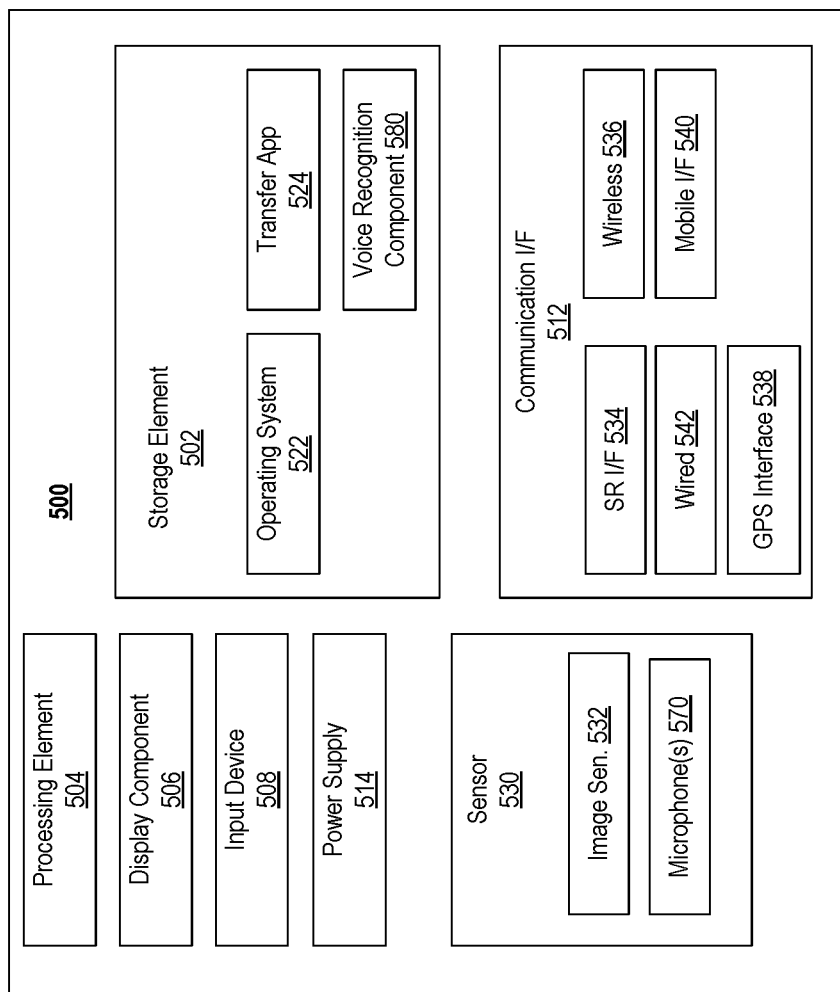
FIGS. 5A-5B are block diagrams showing example systems of computing devices that may be used in accordance with various embodiments described herein.

FIG. 5A is a block diagram showing an example system 500 of a computing device that may be used to implement, at least in part, speech processing system 100, in accordance with various aspects of the present disclosure. It will be appreciated that not all devices will include all of the components of the system 500 and some user devices may include additional components not shown in the system 500. The system 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). In some examples, the processing element 504 may be effective to determine a wakeword and/or to stream audio data to speech processing system 100. The storage element 502 can include one or more different types of memory, data storage, or computer-readable storage media devoted to different purposes within the system 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc.

The storage element 502 may also store software for execution by the processing element 504. An operating system 522 may provide the user with an interface for operating the computing device and may facilitate communications and commands between applications executing on the system 500 and various hardware thereof. A transfer application 524 may be configured to receive images, audio, and/or video from another device (e.g., a mobile device, image capture device, and/or display device) or from an image sensor 532 and/or microphone 570 included in the system 500. In some examples, the transfer application 524 may also be configured to send the received voice requests to one or more voice recognition servers (e.g., speech processing system 100).

When implemented in some user devices, the system 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display content determined provided by a skill executed by the processing element 504 and/or by another computing device.

The system 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the system 500. These input devices 508 may be incorporated into the system 500 or operably coupled to the system 500 via wired or wireless interface. In some examples, system 500 may include a microphone 570 or an array of microphones for capturing sounds, such as voice requests. Voice recognition component 580 may interpret audio signals of sound captured by microphone 570. In some examples, voice recognition component 580 may listen for a "wakeword" to be received by microphone 570. Upon receipt of the wakeword, voice recognition component 580 may stream audio to a voice recognition server for analysis, such as speech processing system 100. In various examples, voice recognition component 580 may stream audio to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The system 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as a computer communication network, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the system 500. A wired communication module 542 may be configured to communicate according to the USB protocol or any other suitable protocol.

The system 500 may also include one or more sensors 530 such as, for example, one or more position sensors, image sensors, and/or motion sensors. An image sensor 532 is shown in FIG. 5A. An example of an image sensor 532 may be a camera configured to capture color information, image geometry information, and/or ambient light information.

Figure 5B:
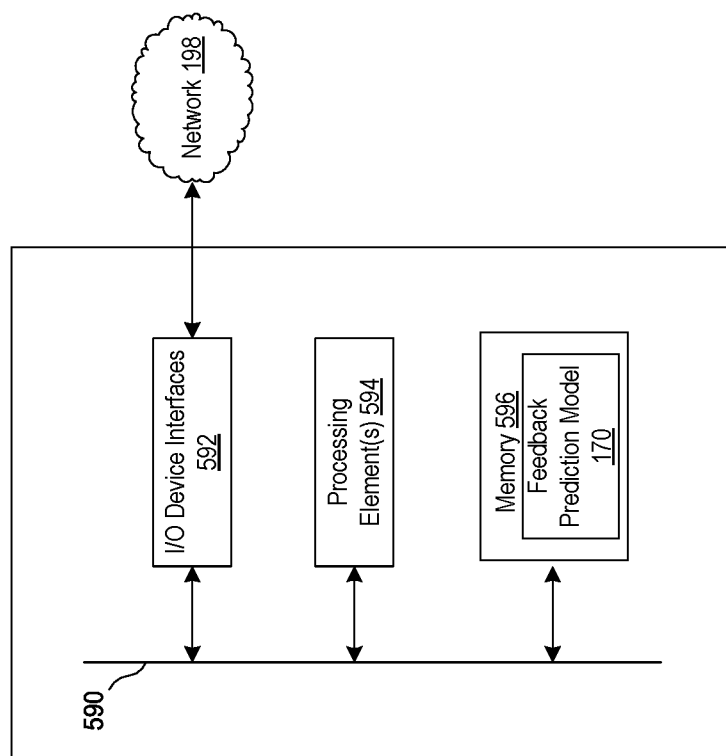

FIG. 5B is a block diagram conceptually illustrating example components of a remote device, such as a computing device executing a particular skill 190, a computing device executing one or more components of speech processing system 100 (e.g., ASR processing components, NLU processing components, etc.) and/or command processing. Multiple computing devices may be included in the system, such as one speech processing computing device for performing ASR processing, one speech processing computing device for performing NLU processing, one or more skill computing device(s) implementing skills 190, etc. In operation, each of these devices (or groups of devices) may include non-transitory computer-readable and computer-executable instructions that reside on the respective device, as will be discussed further below.

Each computing device of speech processing system 100 may include one or more controllers/processors 594, which may each include at least one central processing unit (CPU) for processing data and computer-readable instructions, and a memory 596 for storing data and instructions of the respective device. In at least some examples, memory 596 may store, for example, a list of N-best intents data that may be generated for particular request data. In some examples, memory 596 may store machine learning models of the ranking component 120, skills 190, shortlister 110, etc., when loaded from memory 596. In various further examples, memory 596 may be effective to store instructions effective to program controllers/processors 594 to perform the various techniques described above in reference to ranking and arbitration component 140, decider component 132, feedback prediction model 170, and/or the dynamic routing adjustment described above in reference to FIGS. 1-4. Accordingly, in FIG. 5B, feedback prediction model 170 is depicted as being stored within memory 596, as an example. The memories 596 may individually include volatile random access memory (RAM), non-volatile read only memory (ROM), non-volatile magnetoresistive memory (MRAM), and/or other types of memory. Each computing device of speech processing system 100 may also include memory 596 for storing data and controller/processor-executable instructions. Each memory 596 may individually include one or more non-volatile storage types such as magnetic storage, optical storage, solid-state storage, etc. Each computing device of speech processing system 100 may also be connected to removable or external non-volatile memory and/or storage (such as a removable memory card, memory key drive, networked storage, etc.) through respective input/output device interfaces 592. In various examples, the feature data described above in reference to ranking and arbitration component 140, may be stored in memory 596.

Computer instructions for operating each computing device of speech processing system 100 may be executed by the respective device's controllers/processors 594, using the memory 596 as temporary "working" storage at runtime. A device's computer instructions may be stored in a non-transitory manner in non-volatile memory 596 (e.g., a non-transitory computer-readable memory), memory 596, or an external device(s). Alternatively, some or all of the executable instructions may be embedded in hardware or firmware on the respective device in addition to or instead of software.

Each computing device of speech processing system 100 includes input/output device interfaces 592. A variety of components may be connected through the input/output device interfaces 592, as will be discussed further below. Additionally, each computing device of speech processing system 100 may include an address/data bus 590 for conveying data among components of the respective device. Each component within a computing device of speech processing system 100 may also be directly connected to other components in addition to (or instead of) being connected to other components across the bus 590.

As noted above, multiple devices may be employed in a single system. In such a multi-device system, each of the devices may include different components for performing different aspects of the system's processing. The multiple devices may include overlapping components. The components of the speech processing system 100, as described herein, are exemplary, and may be located as a stand-alone device or may be included, in whole or in part, as a component of a larger device or system.

Figure 6:
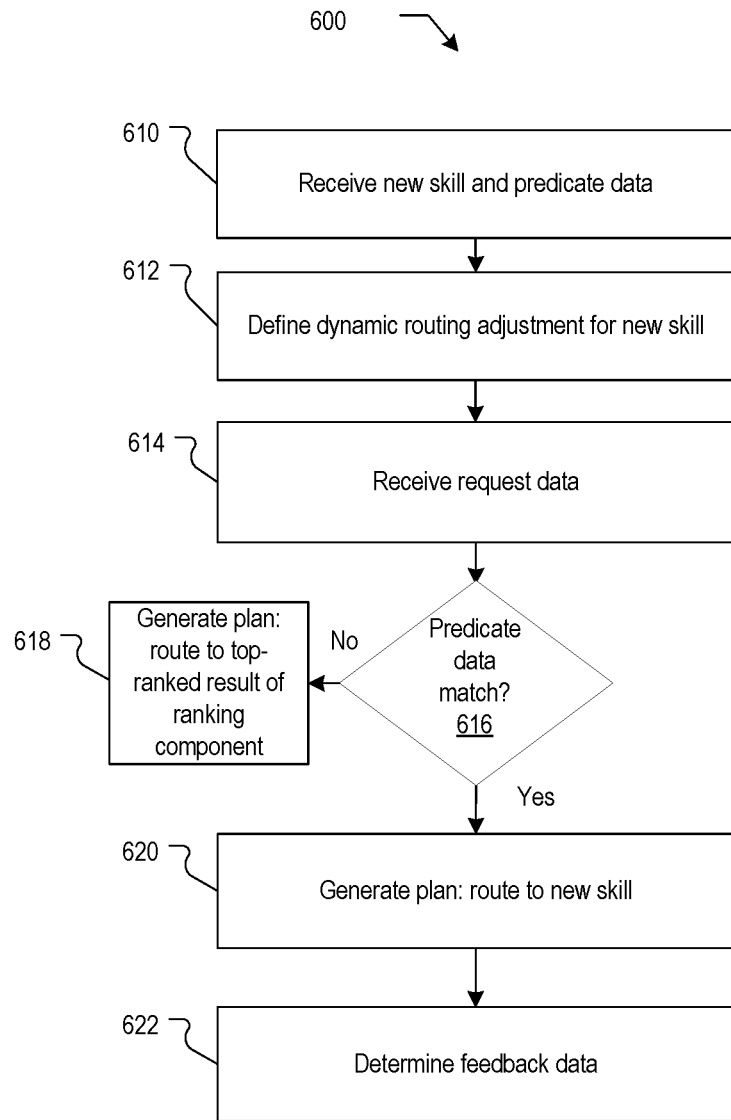
FIG. 6 depicts a flow chart showing an example process for routing utterances to a new skill, in accordance with various aspects of the present disclosure.

FIG. 6 depicts a flow chart showing an example process 600 for routing request data to a new skill, in accordance with various aspects of the present disclosure. Those portions of FIG. 6 that have been previously discussed in reference to FIGS. 1-5B may not be described again for purposes of clarity and brevity. The actions of the process 600 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 600 may begin at action 610, at which data indicating a new skill (e.g., skill ID data) may be received along with predicate data. Predicate data may define types of request data that should be directed to the new skill. For example, the predicate data may define intents, slots, named entities, etc., related to the new skill. In some further examples, the predicate data may define the context of request data that should be directed to the new skill. For example, the predicate data may define a geographic location (e.g., one or more geographic locations in which an entity associated with new skill is operating) from which request data should originate in order to be routed to the new skill.

Processing may continue from action 610 to action 612, at which a dynamic routing adjustment may be defined (e.g., according to exploration policy data) by the decider component 132 for the new skill. In various examples, the dynamic routing adjustment may include policy data that may be used to determine whether to send request data to the new skill for processing, or whether request data should be sent to the top-ranked result of the ranking component 120 for processing.

Processing may continue from action 612 to action 614, at which request data may be received. The characteristics associated with the request data may be determined (e.g., context data, NLU data, ASR data, etc.). At action 616 a determination may be made whether the characteristics of the request data match the predicate data defining request data for processing by the new skill. If not, decider component 132 may generate a plan at action 618. The plan may designate the top-ranked result of ranking component 120 for processing the request data.

Conversely, if a determination is made at action 616 that the characteristics of the request data match the predicate data, decider component 132 may generate a plan at action 620. The plan may designate the new skill for processing the request data. Accordingly, the plan may include data effective to instruct routing service 112 and/or orchestrator 130 to send the request data (along with any associated data, such as intent data, slot data, etc.) to the new skill for processing. Following processing by the new skill, user feedback data may be determined at action 622. The user feedback data may be determined using one or more of the various techniques described herein. For example, implicit and/or explicit user feedback data may be determined. In some embodiments, explicit and/or implicit user feedback data may be predicted using feedback prediction model 170. After a sufficient amount of user feedback data is aggregated, the user feedback data, however generated, may be used to retrain ranking component 120. After retraining the ranking component 120 to accommodate the new skill, the dynamic routing adjustment of the decider component 132 may be removed.

Figure 7:
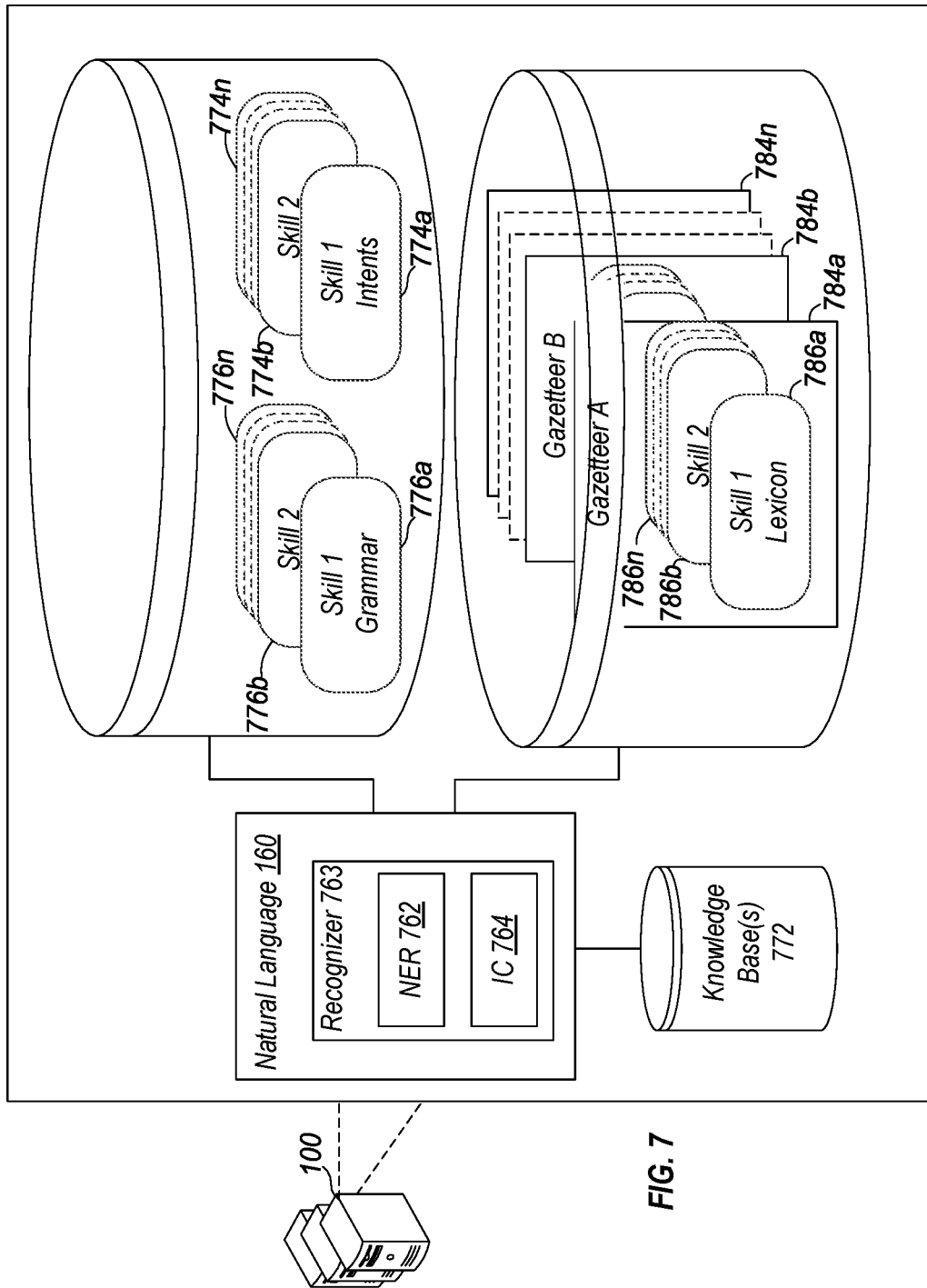
FIG. 7 is a conceptual diagram illustrating how natural language understanding processing is performed according to embodiments of the present disclosure.

FIG. 7 illustrates how NLU processing is performed on text data. Generally, the Natural language component 160 attempts to make a semantic interpretation of text data input thereto. That is, the natural language component 160 determines the meaning behind text data based on the individual words and/or phrases represented therein. The natural language component 160 interprets text data to derive an intent of the user as well as pieces of the text data that allow a device (e.g., a speech processing enabled device, the speech processing system 100, etc.) to complete that action.

The natural language component 160 may process text data including several ASR hypotheses. The natural language component 160 may process all (or a portion of) the ASR hypotheses input therein. Even though the ASR component 150 may output multiple ASR hypotheses, the natural language component 160 may be configured to only process with respect to the top scoring ASR hypothesis. Additionally, as described herein, the ASR component 150 may generate confidence scores associated with each hypothesis (e.g., the confidence scores described above in reference to Table 1).

The natural language component 160 may include one or more recognizers 763. Each recognizer 763 may be associated with a different skill. Each recognizer 763 may process with respect to text data input to the natural language component 160. Each recognizer 763 may operate at least partially in parallel with other recognizers 763 of the natural language component 160.

Each recognizer 763 may include a named entity recognition (NER) component 762. The NER component 762 attempts to identify grammars and lexical information that may be used to construe meaning with respect to text data input therein. The NER component 762 identifies portions of text data that correspond to a named entity that may be applicable to processing performed by a skill. The NER component 762 (or other component of the natural language component 160) may also determine whether a word refers to an entity whose identity is not explicitly mentioned in the text data, for example "him," "her," "it," or other anaphora, exophora, or the like.

Each recognizer 763, and more specifically each NER component 762, may be associated with a particular grammar model and/or database, a particular set of intents/actions (e.g., in intents database 774), and a particular personalized lexicon 786. Each gazetteer 784 may include skill-indexed lexical information associated with a particular user and/or speech processing enabled device. For example, a Gazetteer A (784a) includes skill-indexed lexicon 786a to 786n. A user's music skill lexical information might include album titles, artist names, and song names, for example, whereas a user's contact list skill lexical information might include the names of contacts. Since every user's music collection and contact list is presumably different, this personalized information improves entity resolution.

An NER component 762 applies grammar models 776 and lexicon 786 to determine a mention of one or more entities in text data. In this manner, the NER component 762 identifies "slots" (corresponding to one or more particular words in text data) that may be used for later processing. The NER component 762 may also label each slot with a type (e.g., noun, place, city, artist name, song name, etc.). As previously described, each recognizer 763 may generate confidence scores associated with each named entity and/or with each match of a named entity. In at least some examples, pre-computed features generated by the ranking and arbitration component 140 may be used by the NER component 762 and/or by natural language component 160, generally, in order to generate the N-best list of intents and/or skills for processing a particular request data.

Each grammar model 776 includes the names of entities (i.e., nouns) commonly found in speech about the particular skill to which the grammar model 776 relates, whereas the lexicon 786 is personalized to the user and/or a speech processing enabled device from which the user input originated. For example, a grammar model 776 associated with a shopping skill may include a database of words commonly used when people discuss shopping.

Each recognizer 763 may also include an intent classification (IC) component 764. An IC component 764 parses text data to determine an intent(s). An intent represents an action a user desires be performed. An IC component 764 may communicate with an intents database 774 of words linked to intents. For example, a music intent database may link words and phrases such as "quiet," "volume off," and "mute" to a <Mute> intent. An IC component 764 identifies potential intents by comparing words and phrases in text data to the words and phrases in an intents database 774.

The intents identifiable by a specific IC component 764 are linked to skill-specific grammar models 776 with "slots" to be filled. Each slot of a grammar model 776 corresponds to a portion of text data that the system believes corresponds to an entity. For example, a grammar model 776 corresponding to a <PlayMusic> intent may correspond to sentence structures such as "Play {Artist Name}," "Play {Album Name}," "Play {Song name}," "Play {Song name} by {Artist Name}," etc. However, to make resolution more flexible, grammar models 776 may not be structured as sentences, but rather based on associating slots with grammatical tags.

For example, an NER component 762 may parse text data to identify words as subject, object, verb, preposition, etc. based on grammar rules and/or models prior to recognizing named entities in the text data. An IC component 764 (e.g., implemented by the same recognizer 763 as the NER component 762) may use the identified verb to identify an intent. The NER component 762 may then determine a grammar model 776 associated with the identified intent. For example, a grammar model 776 for an intent corresponding to <PlayMusic> may specify a list of slots applicable to play the identified "object" and any object modifier (e.g., a prepositional phrase), such as {Artist Name}, {Album Name}, {Song name}, etc. The NER component 762 may then search corresponding fields in a lexicon 786, attempting to match words and phrases in text data the NER component 762 previously tagged as a grammatical object or object modifier with those identified in the lexicon 786.

An NER component 762 may perform semantic tagging, which is the labeling of a word or combination of words according to their type/semantic meaning. An NER component 762 may parse text data using heuristic grammar rules, or a model may be constructed using techniques such as hidden Markov models, maximum entropy models, log linear models, conditional random fields (CRF), and the like. For example, an NER component 762 implemented by a music recognizer may parse and tag text data corresponding to "play song Y by the band X" as {Verb}: "Play," {Object}: "song Y," {Object Preposition}: "by," and {Object Modifier}: "band X." The NER component 762 identifies "Play" as a verb, which an IC component 764 may determine corresponds to a <PlayMusic> intent. At this stage, no determination has been made as to the meaning of "song Y" and "band X," but based on grammar rules and models, the NER component 762 has determined the text of these phrases relates to the grammatical object (i.e., entity) of the user input represented in the text data.

The models linked to the intent are then used to determine what database fields should be searched to determine the meaning of these phrases, such as searching a user's gazetteer 784 for similarity with the model slots. For example, a model for a <PlayMusic> intent might indicate to attempt to resolve the identified object based on {Artist Name}, {Album Name}, and {Song name}, and another model for the same intent might indicate to attempt to resolve the object modifier based on {Artist Name}, and resolve the object based on {Album Name} and {Song Name} linked to the identified {Artist Name}. If the search of the gazetteer 784 does not resolve a slot/field using gazetteer information, the NER component 762 may search a database of generic words (e.g., in the knowledge base 772). For example, if the text data includes "play songs by the band X," after failing to determine an album name or song name called "songs" by "the band X," the NER component 762 may search the database for the word "songs." In the alternative, generic words may be checked before the gazetteer information, or both may be tried, potentially producing two different results.

An NER component 762 may tag text data to attribute meaning thereto. For example, an NER component 762 may tag "play song Y by the band X" as: {skill} Music, {intent} <PlayMusic>, {artist name} band X, {media type} SONG, and {song title} song Y. For further example, the NER component 762 may tag "play songs by the band X" as: {skill} Music, {intent}<PlayMusic>, {artist name} band X, and {media type} SONG.

The natural language component 160 may generate cross-skill N-best list data, which may include a list of NLU hypotheses output by each recognizer 763. A recognizer 763 may output tagged text data generated by an NER component 762 and an IC component 764 operated by the recognizer 763, as described above. Each NLU hypothesis including an intent indicator and text/slots may be grouped as an NLU hypothesis represented in cross-skill N-best list data. Each NLU hypothesis may also be associated with one or more respective confidence score(s) for the NLU hypothesis. For example, the cross-skill N-best list data may be represented as, with each line representing a separate NLU hypothesis:

[0.95] Intent: <PlayMusic> ArtistName: Band A SongName: Song B

[0.95] Intent: <PlayVideo> ArtistName: Band A VideoName: Song B

[0.01] Intent: <PlayMusic> ArtistName: Band A AlbumName: Song B

[0.01] Intent: <PlayMusic> SongName: Song B

Ranking component 120 may assign a particular confidence score to each NLU hypothesis input therein. As previously described, machine learning models of the ranking component 120 may use precomputed features generated by ranking and arbitration component 140 as inputs along with the cross-skill N-best list data in order to generate the confidence scores for each NLU hypothesis of the cross-skill N-best list data. The confidence score of an NLU hypothesis may represent a confidence of the system in the NLU processing performed with respect to the NLU hypothesis. The confidence score of a particular NLU hypothesis may be affected by whether the NLU hypothesis has unfilled slots. For example, if an NLU hypothesis associated with a first skill includes slots that are all filled/resolved, that NLU hypothesis may be assigned a higher confidence score than another NLU hypothesis including at least some slots that are unfilled/unresolved by the entity recognition component 762.

The ranking component 120 may apply re-scoring, biasing, and/or other techniques to determine the top scoring NLU hypotheses. To do so, the ranking component 120 may consider not only the data output by the entity recognition component 762, but may also consider other data such as skill rating, popularity data, context data, and/or other features computed by ranking and arbitration component 140.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method for routing requests for speech processing, comprising:
receiving a first utterance comprising a first spoken request;
determining first intent data representing a first semantic interpretation of the first utterance;
determining, using a ranking component of a speech processing system, a first ranked list of a first plurality of speech processing skills for processing the first intent data;
determining exploration policy data indicating a first speech processing skill for processing the first utterance, wherein the first speech processing skill is different from a top-ranked result of the first ranked list;
determining an amount of user feedback data associated with the first speech processing skill;
selecting the first speech processing skill for processing the first intent data based on the amount of user feedback data associated with the first speech processing skill being less than a threshold amount of user feedback data;
determining user feedback data related to processing of the first intent data by the first speech processing skill;
receiving a second utterance comprising a second spoken request, wherein the second spoken request is the same as the first spoken request;
determining second intent data representing a second semantic interpretation of the second utterance;
determining, using the ranking component, a second ranked list of a second plurality of speech processing skills for processing the second intent data, wherein the first speech processing skill is a top-ranked result of the second ranked list; and
selecting the first speech processing skill for processing the second intent data.

2. The method of claim 1, further comprising:
receiving, by a feedback prediction component, the first intent data and first skill data identifying the first speech processing skill; and
generating, by the feedback prediction component, the user feedback data related to processing of the first intent data by the first speech processing skill in response to inputting the first intent data and the first skill data into a machine learning model of the feedback prediction component.

3. The method of claim 1, further comprising:
determining that the first speech processing skill is selected for processing the first intent data due at least in part to the exploration policy data;
generating feedback request data representing a request for user feedback; and
outputting an audio representation of the feedback request data.

4. A method comprising:
receiving first data representing a first natural language input;
determining second data representing a first semantic interpretation of the first natural language input; and
selecting a first intent data processing application for processing the second data according to third data of an exploration policy, wherein less than a threshold amount of feedback data is associated with the first intent data processing application.

5. The method of claim 4, further comprising:
determining first feedback data related to the first intent data processing application processing the second data;
receiving fourth data representing a second natural language input;
determining fifth data representing a second semantic interpretation of the second natural language input, wherein the first semantic interpretation and the second semantic interpretation are the same; and selecting a second intent data processing application for processing the fifth data based at least in part on the first feedback data.

6. The method of claim 5, further comprising:

determining, by a ranking component, a first ranked list of a first plurality of intent data processing applications for processing the second data;

receiving, by the ranking component, the first feedback data; and determining, by the ranking component, a second ranked list of a second plurality of intent data processing applications for processing the fifth data, wherein the first ranked list is different from the second ranked list.

7. The method of claim 4, further comprising:

sending the second data to a first machine learning model used to predict user feedback data;

sending fourth data identifying the first intent data processing application to the first machine learning model;

determining, by the first machine learning model, a confidence score indicating a confidence that the first machine learning model can predict first user feedback for the first intent data processing application;

determining, based on a comparison of the confidence score to a threshold confidence value, that the first machine learning model can predict the first user feedback for the first intent data processing application; and generating, by the first machine learning model, first user feedback data related to the first intent data processing application processing the second data.

8. The method of claim 4, further comprising:

sending the second data to a first machine learning model used to predict user feedback data;

sending fourth data identifying the first intent data processing application to the first machine learning model;

determining, by the first machine learning model, a confidence score indicating a confidence that the first machine learning model can predict first user feedback for the first intent data processing application;

generating, based on a comparison of the confidence score to a threshold confidence value, a feedback request; and outputting audio data representing the feedback request.

9. The method of claim 4, further comprising:

determining that less than the threshold amount of feedback data is associated with the first intent data processing application;

generating, based at least in part on the determining that less than the threshold amount of feedback data is associated with the first intent data processing application, a feedback request; and outputting audio data representing the feedback request.

10. The method of claim 4, further comprising:

determining a ranked list of a plurality of applications for processing the second data, wherein a second intent data processing application is a top-ranked application of the ranked list of the plurality of applications;

determining, from the third data of the exploration policy, that the first intent data processing application is used for processing the second data; and processing the second data by the first intent data processing application.

11. The method of claim 4, further comprising:

determining, by a ranking component, a first ranked list of a first plurality of intent data processing applications for processing the second data, wherein a top-ranked result of the first ranked list is the first intent data processing application;

receiving, by the ranking component, first feedback data from the first intent data processing application processing the second data; and determining, by the ranking component, a second ranked list of a second plurality of intent data processing applications for processing a second natural language input, wherein a second semantic interpretation of the second natural language input is the same as the first semantic interpretation of the first natural language input, and wherein a top-ranked result of the second ranked list is a second intent data processing application.

12. The method of claim 4, further comprising:

predicting first feedback data related to the first intent data processing application processing the second data prior to the first intent data processing application processing the second data;

generating feature data representing the predicted first feedback data related to the first intent data processing application processing the second data;

receiving fourth data representing a second natural language input;

determining fifth data representing a second semantic interpretation of the second natural language input;

sending the feature data to a machine learning model used to rank applications for processing semantic interpretation data; and selecting a second intent data processing application for processing the fifth data based at least in part on an output of the machine learning model.

13. A computing device, comprising:

at least one processor; and at least one non-transitory computer-readable memory storing instructions that, when executed by the at least one processor, are effective to:

receive first data representing a first natural language input;

determine second data representing a first semantic interpretation of the first natural language input; and select a first intent data processing application for processing the second data according to third data of an exploration policy, wherein less than a threshold amount of feedback data is associated with the first intent data processing application.

14. The computing device of claim 13, wherein the at least one non-transitory computer-readable memory stores further instructions that, when executed by the at least one processor, are further effective to:

determine first feedback data related to the first intent data processing application processing the second data;

receive fourth data representing a second natural language input;

determine fifth data representing a second semantic interpretation of the second natural language input, wherein the first semantic interpretation and the second semantic interpretation are the same; and select a second intent data processing application for processing the fifth data based at least in part on the first feedback data.

15. The computing device of claim 14, wherein the at least one non-transitory computer-readable memory stores further instructions that, when executed by the at least one processor, are further effective to:

determine, by a ranking component, a first ranked list of a first plurality of intent data processing applications for processing the second data;
receive, by the ranking component, the first feedback data; and
determine, by the ranking component, a second ranked list of a second plurality of intent data processing applications for processing the fifth data, wherein the first ranked list is different from the second ranked list.

16. The computing device of claim 13, wherein the at least one non-transitory computer-readable memory stores further instructions that, when executed by the at least one processor, are further effective to:
send the second data to a first machine learning model used to predict user feedback data;
send fourth data identifying the first intent data processing application to the first machine learning model;
determine, by the first machine learning model, a confidence score indicating a confidence that the first machine learning model can predict first user feedback for the first intent data processing application;
determine, based on a comparison of the confidence score to a threshold confidence value, that the first machine learning model can predict the first user feedback for the first intent data processing application; and
generate, by the first machine learning model, first user feedback data related to the first intent data processing application processing the second data.

17. The computing device of claim 13, wherein the at least one non-transitory computer-readable memory stores further instructions that, when executed by the at least one processor, are further effective to:
send the second data to a first machine learning model used to predict user feedback data;
send fourth data identifying the first intent data processing application to the first machine learning model;
determine, by the first machine learning model, a confidence score indicating a confidence that the first machine learning model can predict first user feedback for the first intent data processing application;
generate, based on a comparison of the confidence score to a threshold confidence value, a feedback request; and
output audio data representing the feedback request.

18. The computing device of claim 13, wherein the at least one non-transitory computer-readable memory stores further instructions that, when executed by the at least one processor, are further effective to:
determine that less than the threshold amount of feedback data is associated with the first intent data processing application;
generate, based at least in part on the determining that less than the threshold amount of feedback data is associated with the first intent data processing application, a feedback request; and
output audio data representing the feedback request.

19. The computing device of claim 13, wherein the at least one non-transitory computer-readable memory stores further instructions that, when executed by the at least one processor, are further effective to:
determine a ranked list of a plurality of applications for processing the second data, wherein a second intent data processing application is a top-ranked application of the ranked list of the plurality of applications;
determine, from the third data of the exploration policy, that the first intent data processing application is used for processing the second data; and
process the second data by the first intent data processing application.

20. The computing device of claim 13, wherein the at least one non-transitory computer-readable memory stores further instructions that, when executed by the at least one processor, are further effective to:
determine, by a ranking component, a first ranked list of a first plurality of intent data processing applications for processing the second data, wherein a top-ranked result of the first ranked list is the first intent data processing application;
receive, by the ranking component, first feedback data from the first intent data processing application processing the second data; and
determine, by the ranking component, a second ranked list of a second plurality of intent data processing applications for processing a second natural language input, wherein a second semantic interpretation of the second natural language input is the same as the first semantic interpretation of the first natural language input, and wherein a top-ranked result of the second ranked list is a second intent data processing application.

* * * * *